(12) United States Patent
Moore et al.

(10) Patent No.: US 10,655,074 B2
(45) Date of Patent: May 19, 2020

(54) MULTI-STAGE PROCESS AND DEVICE FOR REDUCING ENVIRONMENTAL CONTAMINATES IN HEAVY MARINE FUEL OIL

(71) Applicant: Magĕmă Technology, LLC, Houston, TX (US)

(72) Inventors: Michael Joseph Moore, Houston, TX (US); Bertrand Ray Klussmann, Houston, TX (US); Carter James White, Houston, TX (US)

(73) Assignee: Magĕmă Technology LLC, Houston, TX (US)

( * ) Notice: Subject to any disclaimer, the term of this patent is extended or adjusted under 35 U.S.C. 154(b) by 217 days.

(21) Appl. No.: 15/892,595

(22) Filed: Feb. 9, 2018

(65) Prior Publication Data
US 2018/0230387 A1    Aug. 16, 2018

Related U.S. Application Data

(60) Provisional application No. 62/589,479, filed on Nov. 21, 2017, provisional application No. 62/458,002, filed on Feb. 12, 2017.

(51) Int. Cl.
*C10G 45/04*  (2006.01)
*C10G 67/06*  (2006.01)
(Continued)

(52) U.S. Cl.
CPC ............. *C10G 45/04* (2013.01); *B01D 3/343* (2013.01); *B01D 53/1481* (2013.01);
(Continued)

(58) Field of Classification Search
CPC ........ C10G 45/04; C10G 69/02; C10G 47/02; C10G 65/16; C10G 67/02; C10G 45/02;
(Continued)

(56) References Cited

U.S. PATENT DOCUMENTS

| | | |
|---|---|---|
| 3,163,593 A | 12/1964 | Webster et al. |
| 3,902,991 A | 9/1975 | Christensen et al. |

(Continued)

FOREIGN PATENT DOCUMENTS

| | | |
|---|---|---|
| EP | 804288 A1 | 11/1997 |
| EP | 870817 A1 | 10/1998 |

(Continued)

OTHER PUBLICATIONS

International Search Report issued in corresponding International Application No. PCT/US2018/017855 dated Apr. 27, 2018 (3 pages).
(Continued)

*Primary Examiner* — Randy Boyer
*Assistant Examiner* — Juan C Valencia
(74) *Attorney, Agent, or Firm* — Carter J White

(57) ABSTRACT

A multi-stage process for reducing the environmental contaminants in a ISO 8217 compliant Feedstock Heavy Marine Fuel Oil involving a core desulfurizing process and an ionic liquid extraction desulfurizing process as either a pre-treating step or post-treating step to the core process. The Product Heavy Marine Fuel Oil is compliant with ISO 8217A for residual marine fuel oils and has a sulfur level has a maximum sulfur content (ISO 14596 or ISO 8754) between the range of 0.05% wt. to 0.5% wt. A process plant for conducting the process is also disclosed.

18 Claims, 5 Drawing Sheets

(51) Int. Cl.

| | | |
|---|---|---|
| *C10G 45/22* | (2006.01) | |
| *C10G 45/08* | (2006.01) | |
| *C10G 25/02* | (2006.01) | |
| *C10G 25/00* | (2006.01) | |
| *B01D 53/14* | (2006.01) | |
| *C10G 7/00* | (2006.01) | |
| *C10G 45/06* | (2006.01) | |
| *C10L 1/04* | (2006.01) | |
| *C10G 45/02* | (2006.01) | |
| *C10G 67/02* | (2006.01) | |
| *B01J 8/00* | (2006.01) | |
| *B01J 8/04* | (2006.01) | |
| *B01J 21/04* | (2006.01) | |
| *B01J 23/24* | (2006.01) | |
| *B01J 23/40* | (2006.01) | |
| *B01J 23/74* | (2006.01) | |
| *C10G 65/16* | (2006.01) | |
| *B01J 8/02* | (2006.01) | |
| *B01D 3/34* | (2006.01) | |
| *C10G 47/02* | (2006.01) | |
| *C10G 69/02* | (2006.01) | |

(52) U.S. Cl.
CPC .......... *B01J 8/008* (2013.01); *B01J 8/0278* (2013.01); *B01J 8/0292* (2013.01); *B01J 8/0457* (2013.01); *B01J 8/0492* (2013.01); *B01J 21/04* (2013.01); *B01J 23/24* (2013.01); *B01J 23/40* (2013.01); *B01J 23/74* (2013.01); *C10G 7/00* (2013.01); *C10G 25/003* (2013.01); *C10G 25/02* (2013.01); *C10G 45/02* (2013.01); *C10G 45/06* (2013.01); *C10G 45/08* (2013.01); *C10G 45/22* (2013.01); *C10G 47/02* (2013.01); *C10G 65/16* (2013.01); *C10G 67/02* (2013.01); *C10G 67/06* (2013.01); *C10G 69/02* (2013.01); *C10L 1/04* (2013.01); *B01J 2208/00557* (2013.01); *B01J 2208/02* (2013.01); *B01J 2208/025* (2013.01); *C10G 2300/1037* (2013.01); *C10G 2300/1044* (2013.01); *C10G 2300/1048* (2013.01); *C10G 2300/1059* (2013.01); *C10G 2300/201* (2013.01); *C10G 2300/202* (2013.01); *C10G 2300/205* (2013.01); *C10G 2300/206* (2013.01); *C10G 2300/207* (2013.01); *C10G 2300/208* (2013.01); *C10G 2300/30* (2013.01); *C10G 2300/302* (2013.01); *C10G 2300/308* (2013.01); *C10G 2300/4012* (2013.01); *C10G 2300/4018* (2013.01); *C10G 2300/4062* (2013.01); *C10G 2300/70* (2013.01); *C10G 2300/80* (2013.01); *C10G 2400/04* (2013.01); *C10G 2400/06* (2013.01); *C10L 2200/0263* (2013.01); *C10L 2200/0438* (2013.01); *C10L 2270/02* (2013.01); *C10L 2270/026* (2013.01)

(58) Field of Classification Search
CPC .......... C10G 7/00; C10G 45/06; C10G 67/06; C10G 2300/1037; C10G 2300/201; C10G 2300/206; C10G 2300/208; C10G 2300/1044; C10G 2300/308; C10G 2300/4062; C10G 2400/04; C10G 2300/205; C10G 2300/1048; C10G 2400/06; C10G 2300/302; C10G 2300/202; C10G 2300/1059; C10G 25/003; C10G 25/02; B01J 8/0278; B01J 8/0292; B01J 8/008; B01J 8/0457; B01J 21/04; B01J 23/24; B01J 23/40; B01J 23/74; B01J 2208/02; B01J 2208/00557; B01D 53/1481; C10L 1/04; C10L 2200/0438; C10L 2200/0263; C10L 2270/02

See application file for complete search history.

(56) References Cited

U.S. PATENT DOCUMENTS

| | | |
|---|---|---|
| 4,460,707 A | 7/1984 | Simpson |
| 4,548,710 A | 10/1985 | Simpson |
| 5,306,419 A | 4/1994 | Harrison et al. |
| 5,374,350 A | 12/1994 | Heck et al. |
| 5,389,595 A | 2/1995 | Simpson et al. |
| 5,391,304 A | 2/1995 | Lantos |
| 5,401,392 A | 3/1995 | Courty et al. |
| 5,417,846 A | 5/1995 | Renard |
| 5,494,572 A * | 2/1996 | Horii ................. C10G 21/20 208/12 |
| 5,543,036 A | 8/1996 | Chang et al. |
| 5,591,325 A | 1/1997 | Higashi |
| 5,686,375 A | 11/1997 | Iyer et al. |
| 5,759,385 A | 6/1998 | Aussillous et al. |
| 5,779,992 A | 7/1998 | Higashi |
| 5,837,130 A * | 11/1998 | Crossland ............ C10G 65/00 208/213 |
| 5,882,364 A | 3/1999 | Dilworth |
| 5,888,379 A | 3/1999 | Ushio et al. |
| 5,897,768 A | 4/1999 | McVicker et al. |
| 5,922,189 A | 7/1999 | Santos |
| 5,928,501 A | 7/1999 | Sudhakar et al. |
| 5,948,239 A | 9/1999 | Virdi et al. |
| 5,958,816 A | 9/1999 | Neuman et al. |
| 5,961,709 A | 10/1999 | Hayner et al. |
| 5,976,361 A | 11/1999 | Hood et al. |
| 5,997,723 A | 12/1999 | Wiehe et al. |
| 6,017,443 A | 1/2000 | Buchanan |
| 6,160,193 A | 12/2000 | Gore |
| 6,162,350 A | 12/2000 | Soled et al. |
| 6,193,766 B1 | 2/2001 | Jordan |
| 6,203,695 B1 | 3/2001 | Harle et al. |
| 6,217,749 B1 | 4/2001 | Espeillac et al. |
| 6,251,262 B1 | 6/2001 | Hatanaka et al. |
| 6,251,263 B1 | 6/2001 | Hatanaka et al. |
| 6,299,759 B1 | 10/2001 | Bradway et al. |
| 6,306,287 B1 | 10/2001 | Billon et al. |
| 6,306,289 B1 | 10/2001 | Hayashi et al. |
| 6,328,880 B1 | 12/2001 | Yoshita et al. |
| 6,344,136 B1 | 2/2002 | Butler et al. |
| 6,383,975 B1 | 5/2002 | Rocha et al. |
| 6,402,940 B1 | 6/2002 | Rappas |
| 6,406,615 B1 | 6/2002 | Iwamoto et al. |
| 6,540,904 B1 | 4/2003 | Gun et al. |
| 6,554,994 B1 | 4/2003 | Reynolds et al. |
| 6,566,296 B2 | 5/2003 | Plantenga et al. |
| 6,576,584 B1 | 6/2003 | Iijima et al. |
| 6,620,313 B1 | 9/2003 | Soled et al. |
| 6,649,042 B2 | 11/2003 | Dassori et al. |
| 6,656,348 B2 | 12/2003 | Dassori et al. |
| 6,656,349 B1 | 12/2003 | Fujita et al. |
| 6,712,955 B1 | 3/2004 | Soled et al. |
| 6,733,659 B1 | 5/2004 | Kure et al. |
| 6,783,661 B1 | 8/2004 | Briot et al. |
| 6,797,153 B1 | 9/2004 | Fukuyama et al. |
| 6,858,132 B2 | 2/2005 | Kumagai et al. |
| 6,863,803 B1 | 3/2005 | Riley et al. |
| 6,929,738 B1 | 8/2005 | Riley et al. |
| 7,001,503 B1 | 2/2006 | Koyama et al. |
| 7,108,779 B1 | 9/2006 | Thakkar |
| 7,169,294 B2 | 1/2007 | Abe et al. |
| 7,232,515 B1 | 6/2007 | Demmin et al. |
| 7,244,350 B2 | 7/2007 | Martin et al. |
| 7,288,182 B1 | 10/2007 | Soled et al. |
| 7,384,537 B2 | 6/2008 | Nagamatsu et al. |
| 7,402,547 B2 | 7/2008 | Wellington et al. |
| 7,413,646 B2 | 8/2008 | Wellington et al. |
| 7,416,653 B2 | 8/2008 | Wellington |

(56) References Cited

U.S. PATENT DOCUMENTS

| | | |
|---|---|---|
| 7,491,313 B2 | 2/2009 | Toshima et al. |
| 7,507,325 B2 | 3/2009 | Gueret et al. |
| 7,513,989 B1 | 4/2009 | Soled et al. |
| 7,534,342 B2 | 5/2009 | Bhan et al. |
| 7,585,406 B2 | 9/2009 | Khadzhiev et al. |
| 7,588,681 B2 | 9/2009 | Bhan et al. |
| 7,651,604 B2 | 1/2010 | Ancheyta Juarez et al. |
| 7,651,605 B2 | 1/2010 | Sahara et al. |
| 7,713,905 B2 | 5/2010 | Dufresne et al. |
| 7,718,050 B2 | 5/2010 | Gueret et al. |
| 7,901,569 B2 | 3/2011 | Farshid et al. |
| 7,938,955 B2 | 5/2011 | Araki et al. |
| 7,943,035 B2 | 5/2011 | Chornet et al. |
| 8,012,343 B2 | 9/2011 | Plantenga et al. |
| 8,021,538 B2 | 9/2011 | Klein |
| 8,163,166 B2 | 4/2012 | Wellington et al. |
| 8,173,570 B2 | 5/2012 | Maesen et al. |
| 8,241,489 B2 | 8/2012 | Bhan et al. |
| 8,268,164 B2 | 9/2012 | Wellington et al. |
| 8,343,887 B2 | 1/2013 | Maesen et al. |
| 8,372,268 B2 | 2/2013 | Ginestra et al. |
| 8,394,254 B2 | 3/2013 | Wellington et al. |
| 8,475,651 B2 | 7/2013 | Milam et al. |
| 8,506,794 B2 | 8/2013 | Bhan et al. |
| 8,546,626 B2 | 10/2013 | Daudin et al. |
| 8,563,456 B2 | 10/2013 | Dillon et al. |
| 8,608,938 B2 | 12/2013 | Wellington et al. |
| 8,608,946 B2 | 12/2013 | Bhan et al. |
| 8,613,851 B2 | 12/2013 | Wellington et al. |
| 8,663,453 B2 | 3/2014 | Wellington et al. |
| 8,679,322 B2 | 3/2014 | Marzin et al. |
| 8,702,970 B2 | 4/2014 | Maesen et al. |
| 8,716,164 B2 | 5/2014 | Dillon et al. |
| 8,722,558 B2 | 5/2014 | Konno et al. |
| 8,722,563 B2 | 5/2014 | Soled et al. |
| 8,722,564 B2 | 5/2014 | Soled et al. |
| 8,741,129 B2 | 6/2014 | Brown et al. |
| 8,764,972 B2 | 7/2014 | Bhan et al. |
| 8,784,646 B2 | 7/2014 | Sanchez et al. |
| 8,795,514 B2 | 8/2014 | Kimura et al. |
| 8,821,714 B2 | 9/2014 | Chaumonnot et al. |
| 8,894,838 B2 | 11/2014 | Dindi et al. |
| 8,946,110 B2 | 2/2015 | Toledo Antonio et al. |
| 8,987,537 B1 | 3/2015 | Droubi et al. |
| 8,999,011 B2 | 4/2015 | Stern et al. |
| 9,057,035 B1 | 6/2015 | Kraus et al. |
| 9,109,176 B2 | 8/2015 | Stern et al. |
| 9,127,215 B2 | 9/2015 | Choi et al. |
| 9,127,218 B2 | 9/2015 | Banerjee et al. |
| 9,216,407 B2 | 12/2015 | Duma et al. |
| 9,278,339 B2 | 3/2016 | Bellussi et al. |
| 9,340,733 B2 | 5/2016 | Marchand et al. |
| 9,387,466 B2 | 7/2016 | Rana et al. |
| 9,434,893 B2 | 9/2016 | Dufresne |
| 9,650,580 B2 | 5/2017 | Merdrignac et al. |
| 9,657,236 B2 | 5/2017 | Yang et al. |
| 9,737,883 B2 | 8/2017 | Yamane et al. |
| 9,896,630 B2 | 2/2018 | Weiss et al. |
| 9,908,105 B2 | 3/2018 | Duma et al. |
| 9,908,107 B2 | 3/2018 | Osaki et al. |
| 9,919,293 B1 | 3/2018 | Rana et al. |
| 2001/0001036 A1 | 5/2001 | Espeillac et al. |
| 2001/0013484 A1 | 8/2001 | Zeuthen et al. |
| 2002/0037806 A1 | 3/2002 | Dufresne et al. |
| 2002/0045540 A1 | 4/2002 | Bartholdy |
| 2002/0056664 A1 | 5/2002 | Chabot |
| 2002/0070147 A1 | 6/2002 | Sonnemans et al. |
| 2002/0117426 A1 | 8/2002 | Holder |
| 2002/0144932 A1 | 10/2002 | Gong et al. |
| 2002/0148757 A1 | 10/2002 | Huff et al. |
| 2002/0157990 A1 | 10/2002 | Feimer et al. |
| 2002/0195375 A1 | 12/2002 | Chapus et al. |
| 2003/0042172 A1 | 3/2003 | Sharivker et al. |
| 2003/0125198 A1 | 7/2003 | Ginestra et al. |
| 2003/0131526 A1 | 7/2003 | Kresnyak et al. |
| 2003/0146133 A1 | 8/2003 | Nagamatsu et al. |
| 2003/0217951 A1 | 11/2003 | Marchal-George et al. |
| 2004/0007501 A1 | 1/2004 | Sughrue et al. |
| 2004/0020829 A1 | 2/2004 | Magna et al. |
| 2004/0040890 A1 | 3/2004 | Morton et al. |
| 2004/0055934 A1 | 3/2004 | Tromeur et al. |
| 2004/0134837 A1 | 7/2004 | Dassori |
| 2004/0178117 A1 | 9/2004 | Morton et al. |
| 2004/0186014 A1 | 9/2004 | Tsukada et al. |
| 2004/0209771 A1 | 10/2004 | Abe et al. |
| 2004/0232041 A1 | 11/2004 | Kiser et al. |
| 2004/0256293 A1 | 12/2004 | Abe et al. |
| 2005/0020446 A1 | 1/2005 | Choudhary et al. |
| 2005/0101480 A1 | 5/2005 | Ackerman et al. |
| 2005/0109674 A1 | 5/2005 | Klein |
| 2005/0113250 A1 | 5/2005 | Schleicher et al. |
| 2005/0133405 A1 | 6/2005 | Wellington et al. |
| 2005/0133406 A1 | 6/2005 | Wellington et al. |
| 2005/0133411 A1 | 6/2005 | Zeuthen et al. |
| 2005/0133416 A1 | 6/2005 | Bhan et al. |
| 2005/0133417 A1 | 6/2005 | Bhan et al. |
| 2005/0135997 A1 | 6/2005 | Wellington et al. |
| 2005/0139512 A1 | 6/2005 | Wellington et al. |
| 2005/0139520 A1 | 6/2005 | Bhan et al. |
| 2005/0139522 A1 | 6/2005 | Bhan et al. |
| 2005/0145537 A1 | 7/2005 | Wellington et al. |
| 2005/0145538 A1 | 7/2005 | Wellington et al. |
| 2005/0145543 A1 | 7/2005 | Bhan et al. |
| 2005/0148487 A1 | 7/2005 | Brownscombe et al. |
| 2005/0150156 A1 | 7/2005 | Karas et al. |
| 2005/0150818 A1 | 7/2005 | Bhan et al. |
| 2005/0155906 A1 | 7/2005 | Wellington et al. |
| 2005/0167321 A1 | 8/2005 | Wellington et al. |
| 2005/0167327 A1 | 8/2005 | Bhan et al. |
| 2005/0167328 A1 | 8/2005 | Bhan et al. |
| 2005/0167329 A1 | 8/2005 | Bhan et al. |
| 2005/0167331 A1 | 8/2005 | Bhan et al. |
| 2005/0269245 A1 | 12/2005 | Huve |
| 2006/0052235 A1 | 3/2006 | Bai et al. |
| 2006/0060501 A1 | 3/2006 | Gauthier et al. |
| 2006/0060509 A1 | 3/2006 | Miyauchi et al. |
| 2006/0060510 A1 | 3/2006 | Bhan |
| 2006/0102522 A1 | 5/2006 | Turaga et al. |
| 2006/0115392 A1 | 6/2006 | Dassori |
| 2006/0175229 A1 | 8/2006 | Montanari et al. |
| 2006/0211900 A1 | 9/2006 | Iki et al. |
| 2006/0231456 A1 | 10/2006 | Bhan |
| 2006/0231465 A1 | 10/2006 | Bhan |
| 2006/0234876 A1 | 10/2006 | Bhan |
| 2006/0234877 A1 | 10/2006 | Bhan |
| 2006/0249429 A1 | 11/2006 | Iki et al. |
| 2006/0281638 A1 | 12/2006 | Zaid et al. |
| 2006/0289340 A1 | 12/2006 | Brownscombe et al. |
| 2007/0000808 A1 | 1/2007 | Bhan et al. |
| 2007/0000810 A1 | 1/2007 | Bhan et al. |
| 2007/0012595 A1 | 1/2007 | Brownscombe et al. |
| 2007/0072765 A1 | 3/2007 | Soled et al. |
| 2007/0084753 A1 | 4/2007 | Iki et al. |
| 2007/0105714 A1 | 5/2007 | Turaga et al. |
| 2007/0108098 A1 | 5/2007 | Flint et al. |
| 2007/0131584 A1 | 6/2007 | Kalnes |
| 2007/0138055 A1 | 6/2007 | Farshid et al. |
| 2007/0170096 A1 | 7/2007 | Shan et al. |
| 2007/0175797 A1 | 8/2007 | Iki et al. |
| 2007/0284285 A1 | 12/2007 | Stepanik et al. |
| 2008/0017551 A1 | 1/2008 | Kiriyama et al. |
| 2008/0047875 A1 | 2/2008 | Karas et al. |
| 2008/0073247 A1 | 3/2008 | Bolshakov et al. |
| 2008/0085225 A1 | 4/2008 | Bran et al. |
| 2008/0135453 A1 | 6/2008 | Bhan |
| 2008/0149531 A1 | 6/2008 | Roy-Auberger et al. |
| 2008/0167180 A1 | 7/2008 | Van Den Brink et al. |
| 2008/0210595 A1 | 9/2008 | Bolshakov et al. |
| 2008/0223755 A1 | 9/2008 | Roy-Auberger et al. |
| 2008/0230440 A1 | 9/2008 | Graham et al. |
| 2008/0245700 A1 | 10/2008 | Wellington et al. |
| 2008/0245702 A1 | 10/2008 | Wellington et al. |
| 2008/0262115 A1 | 10/2008 | Calis et al. |
| 2008/0272027 A1 | 11/2008 | Wellington et al. |

(56) References Cited

U.S. PATENT DOCUMENTS

| | | |
|---|---|---|
| 2008/0272028 A1 | 11/2008 | Wellington et al. |
| 2008/0308459 A1 | 12/2008 | Iki et al. |
| 2009/0048097 A1 | 2/2009 | Jones et al. |
| 2009/0057194 A1 | 3/2009 | Farshid et al. |
| 2009/0057197 A1 | 3/2009 | Bhan et al. |
| 2009/0062590 A1 | 3/2009 | Nadler et al. |
| 2009/0114569 A1 | 5/2009 | Osaheni et al. |
| 2009/0134064 A1 | 5/2009 | Reynolds |
| 2009/0139902 A1 | 6/2009 | Kressmann et al. |
| 2009/0166260 A1 | 7/2009 | Roy-Auberger et al. |
| 2009/0178951 A1 | 7/2009 | Balthasar et al. |
| 2009/0230022 A1 | 9/2009 | Gorbaty et al. |
| 2009/0234166 A1 | 9/2009 | Gorbaty et al. |
| 2009/0255850 A1 | 10/2009 | Bhan et al. |
| 2009/0255851 A1 | 10/2009 | Bhan et al. |
| 2009/0275788 A1 | 11/2009 | Bedard et al. |
| 2009/0283444 A1 | 11/2009 | Bhan et al. |
| 2009/0288987 A1 | 11/2009 | Bhan et al. |
| 2009/0308791 A1 | 12/2009 | Bhan et al. |
| 2009/0308812 A1 | 12/2009 | Osaheni et al. |
| 2009/0314686 A1 | 12/2009 | Zimmerman |
| 2010/0006475 A1 | 1/2010 | Ginestra |
| 2010/0018902 A1 | 1/2010 | Brownscombe et al. |
| 2010/0025291 A1 | 2/2010 | Shafi et al. |
| 2010/0044274 A1 | 2/2010 | Brun et al. |
| 2010/0055005 A1 | 3/2010 | Bhan et al. |
| 2010/0098602 A1 | 4/2010 | Bhan et al. |
| 2010/0155301 A1 | 6/2010 | Guichard et al. |
| 2010/0200463 A1 | 8/2010 | Patron et al. |
| 2010/0213103 A1 | 8/2010 | Patron et al. |
| 2010/0243526 A1 | 9/2010 | Ginestra et al. |
| 2010/0243532 A1 | 9/2010 | Myers et al. |
| 2010/0264067 A1 | 10/2010 | Osaheni et al. |
| 2010/0294698 A1 | 11/2010 | e Mello et al. |
| 2010/0326890 A1 | 12/2010 | Bhan |
| 2011/0017637 A1 | 1/2011 | Reynolds et al. |
| 2011/0079542 A1 | 4/2011 | Ellis et al. |
| 2011/0083997 A1 | 4/2011 | Silva et al. |
| 2011/0094938 A1 | 4/2011 | Morel |
| 2011/0108461 A1 | 5/2011 | Gabrielov et al. |
| 2011/0127194 A1 | 6/2011 | Zhang et al. |
| 2011/0155558 A1 | 6/2011 | Cardoso et al. |
| 2011/0155644 A1 | 6/2011 | Bhattacharyya et al. |
| 2011/0174681 A1 | 7/2011 | Milam et al. |
| 2011/0178346 A1 | 7/2011 | Milam et al. |
| 2011/0186477 A1 | 8/2011 | Milam et al. |
| 2011/0186480 A1 | 8/2011 | Milam et al. |
| 2011/0203971 A1 | 8/2011 | Kiss et al. |
| 2011/0218097 A1 | 9/2011 | Rayo Mayoral et al. |
| 2011/0240517 A1 | 10/2011 | Chornet et al. |
| 2011/0277377 A1 | 11/2011 | Novak et al. |
| 2012/0018352 A1 | 1/2012 | Seki et al. |
| 2012/0103868 A1 | 5/2012 | Dindi et al. |
| 2012/0116145 A1 | 5/2012 | Bhan et al. |
| 2012/0145528 A1 | 6/2012 | Myers et al. |
| 2012/0175285 A1 | 7/2012 | Bhan et al. |
| 2012/0175286 A1 | 7/2012 | Bhan et al. |
| 2012/0181219 A1 | 7/2012 | Seki et al. |
| 2013/0037447 A1 | 2/2013 | Zimmerman |
| 2013/0081977 A1 | 4/2013 | Woo et al. |
| 2013/0105357 A1 | 5/2013 | Bhan |
| 2013/0105364 A1 | 5/2013 | Bhan |
| 2013/0126393 A1 | 5/2013 | Ginestra et al. |
| 2013/0171039 A1 | 7/2013 | Graham et al. |
| 2013/0186806 A1 | 7/2013 | Diehl et al. |
| 2013/0225400 A1 | 8/2013 | Liang et al. |
| 2013/0256190 A1 | 10/2013 | Van Wees et al. |
| 2013/0267409 A1 | 10/2013 | Lee et al. |
| 2013/0277273 A1 | 10/2013 | Mazyar |
| 2013/0288885 A1 | 10/2013 | Domokos et al. |
| 2013/0306517 A1 | 11/2013 | Kester et al. |
| 2014/0027351 A1 | 1/2014 | Bazer-Bachi et al. |
| 2014/0061094 A1 | 3/2014 | Xu et al. |
| 2014/0073821 A1 | 3/2014 | Mitsui et al. |
| 2014/0076783 A1 | 3/2014 | Bhan |
| 2014/0097125 A1 | 4/2014 | Bazer-Bachi et al. |
| 2014/0166540 A1 | 6/2014 | Guichard et al. |
| 2014/0174980 A1 | 6/2014 | Brown et al. |
| 2014/0174983 A1 | 6/2014 | Klein et al. |
| 2014/0183098 A1 | 7/2014 | Cooper et al. |
| 2014/0183099 A1 | 7/2014 | Ginestra et al. |
| 2014/0305843 A1 | 10/2014 | Kraus et al. |
| 2014/0315712 A1 | 10/2014 | Smegal |
| 2014/0323779 A1 | 10/2014 | Alphazan et al. |
| 2014/0326642 A1 | 11/2014 | Tanaka et al. |
| 2014/0353210 A1 | 12/2014 | Graham et al. |
| 2015/0057205 A1 | 2/2015 | Morishima et al. |
| 2015/0108039 A1 | 4/2015 | Bhan |
| 2015/0111726 A1 | 4/2015 | Bhan et al. |
| 2015/0144531 A1 | 5/2015 | Ginstra et al. |
| 2015/0144532 A1 | 5/2015 | He et al. |
| 2015/0217261 A1 | 8/2015 | Norling |
| 2015/0224476 A1 | 8/2015 | Plecha et al. |
| 2015/0240174 A1 | 8/2015 | Kraus et al. |
| 2015/0315480 A1 | 11/2015 | Hanks et al. |
| 2015/0321177 A1 | 11/2015 | Rana et al. |
| 2015/0337225 A1 | 11/2015 | Droubi et al. |
| 2015/0353848 A1 | 12/2015 | Patron |
| 2015/0353851 A1 | 12/2015 | Buchanan |
| 2016/0001272 A1 | 1/2016 | Daudin |
| 2016/0017240 A1 | 1/2016 | Duma et al. |
| 2016/0024396 A1 | 1/2016 | Zink et al. |
| 2016/0060549 A1 | 3/2016 | Ancheyta Juarez et al. |
| 2016/0075954 A1 | 3/2016 | Monson et al. |
| 2016/0122666 A1 | 5/2016 | Weiss et al. |
| 2016/0129428 A1 | 5/2016 | Bhan |
| 2016/0145503 A1 | 5/2016 | Xu et al. |
| 2016/0145508 A1 | 5/2016 | Xu et al. |
| 2016/0152901 A1 | 6/2016 | Dufresne |
| 2016/0160139 A1 | 6/2016 | Robinson et al. |
| 2016/0177205 A1 | 6/2016 | Evans et al. |
| 2016/0200990 A1 | 7/2016 | Mori et al. |
| 2016/0220985 A1 | 8/2016 | Osaki et al. |
| 2016/0220986 A1 | 8/2016 | Osaki et al. |
| 2016/0230102 A1 | 8/2016 | Osaki et al. |
| 2016/0243528 A1 | 8/2016 | He et al. |
| 2016/0250622 A1 | 9/2016 | He et al. |
| 2016/0256856 A1 | 9/2016 | Kester et al. |
| 2016/0264887 A1 | 9/2016 | Davydov |
| 2016/0304794 A1 | 10/2016 | Majcher et al. |
| 2016/0340597 A1 | 11/2016 | Baldassari et al. |
| 2016/0348012 A1 | 12/2016 | Zhao et al. |
| 2016/0348013 A1 | 12/2016 | Ladkat et al. |
| 2016/0362615 A1 | 12/2016 | Ancheyta Juarez et al. |
| 2017/0002273 A1 | 1/2017 | Rubin-Pitel et al. |
| 2017/0002279 A1 | 1/2017 | Brown et al. |
| 2017/0009163 A1 | 1/2017 | Kraus et al. |
| 2017/0022433 A1 | 1/2017 | Brown et al. |
| 2017/0029723 A1 | 2/2017 | Bazer-Bachi et al. |
| 2017/0044451 A1 | 2/2017 | Kar et al. |
| 2017/0058205 A1 | 3/2017 | Ho et al. |
| 2017/0058223 A1 | 3/2017 | Droubi et al. |
| 2017/0066979 A1 | 3/2017 | Lei et al. |
| 2017/0073592 A1 | 3/2017 | Nonaka et al. |
| 2017/0120224 A1 | 5/2017 | Boualleg et al. |
| 2017/0120228 A1 | 5/2017 | Boualleg et al. |
| 2017/0120229 A1 | 5/2017 | Boualleg et al. |
| 2017/0121612 A1 | 5/2017 | Boualleg et al. |
| 2017/0128912 A1 | 5/2017 | Boualleg et al. |
| 2017/0136446 A1 | 5/2017 | Carati et al. |
| 2017/0137725 A1 | 5/2017 | Boualleg et al. |
| 2017/0165639 A1 | 6/2017 | Klein et al. |
| 2017/0175012 A1 | 6/2017 | Schleiffer et al. |
| 2017/0183575 A1 | 6/2017 | Rubin-Pitel et al. |
| 2017/0183582 A1 | 6/2017 | Hoehn et al. |
| 2017/0260463 A1 | 9/2017 | Schleiffer et al. |
| 2017/0267937 A1 | 9/2017 | Schleiffer et al. |
| 2017/0306250 A1 | 10/2017 | Ginestra |
| 2017/0306252 A1 | 10/2017 | Malek Abbaslou et al. |
| 2017/0335206 A1 | 11/2017 | Mukherjee et al. |
| 2017/0349846 A1 | 12/2017 | Ding et al. |
| 2017/0355913 A1 | 12/2017 | Mountainland et al. |
| 2017/0355914 A1 | 12/2017 | Weiss et al. |
| 2017/0362514 A1 | 12/2017 | Hanks et al. |

(56) References Cited

U.S. PATENT DOCUMENTS

| | | |
|---|---|---|
| 2018/0016505 A1 | 1/2018 | Matsushita |
| 2018/0104676 A1 | 4/2018 | Yamane et al. |
| 2018/0134972 A1 | 5/2018 | Brown et al. |
| 2018/0134974 A1 | 5/2018 | Weiss et al. |
| 2018/0147567 A1 | 5/2018 | Matsushita et al. |
| 2018/0154340 A1 | 6/2018 | Boualleg et al. |
| 2018/0230388 A1 | 8/2018 | Li et al. |
| 2018/0251690 A1 | 9/2018 | Mountainland et al. |

FOREIGN PATENT DOCUMENTS

| | | |
|---|---|---|
| EP | 876443 A1 | 11/1998 |
| EP | 952888 A1 | 11/1999 |
| EP | 1041133 A1 | 10/2000 |
| EP | 1052015 A1 | 11/2000 |
| EP | 1299192 A1 | 4/2003 |
| EP | 1358302 | 11/2003 |
| EP | 1352946 A4 | 12/2004 |
| EP | 1567262 A1 | 8/2005 |
| EP | 1709141 A2 | 10/2006 |
| EP | 1894625 A2 | 3/2008 |
| EP | 2130895 A1 | 12/2009 |
| EP | 2167616 A1 | 3/2010 |
| EP | 2510076 A2 | 10/2012 |
| EP | 2907867 A1 | 8/2015 |
| EP | 2947133 A1 | 11/2015 |
| EP | 2947135 A1 | 11/2015 |
| EP | 2978824 | 2/2016 |
| EP | 2992070 A2 | 3/2016 |
| EP | 3041608 A1 | 7/2016 |
| EP | 3074485 | 10/2016 |
| EP | 2990465 A1 | 3/2019 |
| FR | 3011004 A1 | 3/2015 |
| FR | 3013723 A1 | 5/2015 |
| JP | 2015059220 A | 3/2015 |
| WO | 9113951 A1 | 9/1991 |
| WO | 9919061 A1 | 4/1999 |
| WO | 200145839 A1 | 6/2001 |
| WO | 0209870 A2 | 2/2002 |
| WO | 02062926 A2 | 8/2002 |
| WO | 2004052534 A1 | 6/2004 |
| WO | 2004053028 A1 | 6/2004 |
| WO | 2005028596 A1 | 3/2005 |
| WO | 2009001314 A1 | 12/2008 |
| WO | 2014096703 A1 | 6/2014 |
| WO | 2014160603 A1 | 10/2014 |
| WO | 201534521 A1 | 3/2015 |
| WO | 2015078674 A1 | 6/2015 |
| WO | 2015097199 A1 | 7/2015 |
| WO | 2015122931 A1 | 8/2015 |
| WO | 2015147222 A1 | 10/2015 |
| WO | 2015147223 A1 | 10/2015 |
| WO | 2015178941 A1 | 11/2015 |
| WO | 2015179017 A2 | 11/2015 |
| WO | 2015189190 A1 | 12/2015 |
| WO | 2016089590 A1 | 6/2016 |
| WO | 2016146326 A1 | 9/2016 |
| WO | 2016195973 A1 | 12/2016 |
| WO | 201780387 A1 | 5/2017 |
| WO | 2017186484 A1 | 11/2017 |
| WO | 2018073018 A1 | 4/2018 |
| WO | 2018075015 A1 | 4/2018 |
| WO | 2018075016 A1 | 4/2018 |
| WO | 2018075017 A1 | 4/2018 |
| WO | 2018093535 A1 | 5/2018 |
| WO | 2018101244 A1 | 6/2018 |

OTHER PUBLICATIONS

International Search Report issued in corresponding International Application No. PCT/US2018/017863 dated Apr. 27, 2018 (3 pages).

Tesoro Refining & Marketing Co. Material Safety Data Sheet—Fuel Oil, pp. 1-10, Jul. 26, 2012, San Antonio, Texas, US.

Tesoro Refining & Marketing Co. Material Safety Data Sheet—Marine Gas Oil, pp. 1-11, Nov. 17, 2012, San Antonio, Texas, US.

Tesoro Refining & Marketing Co. Material Safety Data Sheet—Resid pp. 1-10, Apr. 6, 2015, San Antonio, Texas, US.

Coutrymark Refining and Logistics, LLC, Material Safety Data Sheet—No. 6 Fuel Oil, Dec. 2012, pp. 1-4, Mt. Vernon, Indiana US.

Valero Marekting & Supply Company, Material Safety Data Sheet—Residual Fuel Oil, Dec. 4, 2010, pp. 1-14, San Antonio, Texas US.

Oceanbat SA. Material Safety Data Sheet—Marine Fuel Oil, Jul. 2013, pp. 1-7, Guayaquil Ecuador.

Exxonmobilcorporation, Material Safety Data Sheet—Marine Fuel Oil, pp. 1-12, Sep. 18, 2013, Fairfax Virginia US.

Shell Trading (US) Company, Material Safety Data Sheet—Ultra Low Sulfur Fuel Oil, pp. 1-21, Jun. 19, 2018, Houston, Texas US.

Suncor Energy Inc., Material Safety Data Sheet—Heating Fuel Oil Type 6 / Residual Marine Fuel, pp. 1-11, Jun. 7, 2018, Calgary Alberta Canada.

Marathon Petroleum Company LP, Material Safety Data Sheet—Marathon No. 6 Fuel Oil, Dec. 7, 2010, pp. 1-14, Findlay, Ohio US.

BP Australia Pty Ltd., Material Safety Data Sheet—BP380 Marine Fuel, Oct. 27, 2011. pp. 1-6, Docklands, Victoria Australia.

U.S. Oil & Refining Co., Material Safety Data Sheet—Residual Fuel Oil, Dec. 18, 2008, pp. 1-11. Tacoma, Washington US.

American Bureau of Shipping, Publication 31 Notes on Heavy Fuel Oil, 1984, pp. 1-68, Houston Texas US.

American Bureau of Shipping, Notes Use of Low Sulphur Marine Fuel for Main and Auxiliary Diesel Engines, Jan. 1, 2010, pp. 1-68, Houston Texas US (https://www.eagle.org/eagleExternalPortalWEB/ShowProperty/BEA%20Repository/pdfs/Regulatory/Docs/LowSulphurNote_Engine).

Shuyi Zhang, Dong Liu, Wenan Deng, Guohe Que, A Review of Slurry-Phase Hydrocracking Heavy Oil Technology, Energy & Fuels, vol. 21, No. 6, Nov. 2007, pp. 3057-3062, American Chemical Society, Washington DC US.

Peiman Pourmoghaddam, Susan Davari, Zahra Delavar Moghaddam, A Technical and Economic Assessment of Fuel Oil Hydrotreating Technology for Steam Power Plant SO2 and NOx Emissions Control, Advances in Environmental Technology vol. 2, Issue 1, Accepted Oct. 3, 2016, pp. 45-54, Iranian Research Organization for Science and Technology, Tehran Islamic Republic of Iran.

Dawoud Bahzad, Jamal Al-Fadhli, Ayyad Al-Dhafeeri, Ali Abdal, Assessment of Selected Apparent Kinetic Parameters of the HDM and HDS reactions of Two Kuwaiti Residual Oils, Using Two Types of Commercial ARDS Catalysts, Energy & Fuels, vol. 24, Jan. 8, 2010, pp. 1495-1501, American Chemical Society, Washington DC US.

A. Marafi, A. Hauser, A Stanislaus, Atmospheric Residual Desulfurization Process for Residual Oil Upgrading: An Investigation of the Effect of Catalyst Type and Operation Severity on Product Oil Quality, Energy & Fuels, vol. 20, Apr. 4, 2006, pp. 1145-1149, American Chemical Society, Washington DC US.

M.M. Boduszynki, C.E. Rechsteiner, A.S.G. Shafzadeh, R.M.K. Carlson, Composition and Properties of Heavy Crudes, No. 1998. 202 UNITAR Centre for Heavy Crude and Tar Sands, 1998, pp. 1-12, Canada.

Gard AS, Bunkers and Bunkering—A selection of articles previously published by Gard AS, Jan. 2014, pp. 1-53, Arendal Norway.

Monique B. Vermeire Everything You Need to Know About Marine Fuels, Jun. 2012, pp. 1-32, Ghent Belgium.

Chevron Lummus Group, Product web page—RDS / VRDS, 2013-2018, pp. 1-2, http://www.chevrontechnologymarketing.com/CLGtech/rds_vrds.aspx.

T.M. Saleh, H. Ismail, J.E.Corbett, R.S. Bali, Commercial Experience in the Operation of Atmospheric Residue Desulfurization Unit in Kuwait national Petroleum Company At Mina Al-Ahmadi Refinery, Catalyst in Petroleum Refining, 1989, pp. 175-189, Elsevier Science Publishers B.V., Amsterdam The Netherlands.

Victor S. Semeykina, Ekaterina V. Parkhomchuk, Alexander V. Polukhin, Pavel D. Parunin, Anton I. Lysikov, Artem B. Ayupov, Svetlana V. Cherepanova, Vladislav V. Kanazhevskiy, Vasil V. Kaichev, Tatyana S. Glazneva, Valentina V. Zvereva, CoMoNi Catalyst Texture and Surface Properties in Heavy Oil Processing. Part I: Hierarchical Macro / Mesoporous Alumina Support, Indus-

(56) References Cited

OTHER PUBLICATIONS trial & Engineering Chemistry Research, vol. 55, Feb. 29, 2016, pp. 3535-3545 American Chemical Society, Washington DC US.

Victor S. Semeykina, Ekaterina V. Parkhomchuk, Alexander V. Polukhin, Pavel D. Parunin, Anton I. Lysikov, Artem B. Ayupov, Svetlana V. Cherepanova, Vladislav V. Kanazhevskiy, Vasil V. Kaichev, Tatyana S. Glazneva, Valentina V. Zvereva, CoMoNi Catalyst Texture and Surface Properties in Heavy Oil Processing. Part II: Macroporous Sepiolite-Like Mineral, Industrial & Engineering Chemistry Research, vol. 55, Aug. 1, 2016, pp. 9129-9139 American Chemical Society, Washington DC US.

Andre Hauser, Abdulazim Marafi, Adel Almutairi, Anthony Stanislaus, Comparative Study of Hydrodemetallization (HDM) Catalyst Aging by Boscan Feed and Kuwait Atmospheric Residue, Enemy & Fuels, vol. 22 Aug. 27, 2008, pp. 2952-2932, American Chemical Society, Washington DC US.

Criterion Catalysts & Technologies LP, Residue Upgradng Product Information Sheet, pp. 1 & 2, Aug. 2008, Houston Texas US.

John-Laurent Tronche, Jelena Grigorjeva, Annie Siebert (editor), How Are Refiners Preparing For 2015 Marine Fuel Spec Changes?, pp. 1-2, Jun. 6, 2014, S&P Global Plans. Houston Texas US.

DNV GL Maritime, Hong Kong Requires Ocean-Going Vessels to Comply with 0.50% M/M Sulphur Limit While at Berth, Statutory Update No. 1, March 2015, p. 1, DNV GL Maritime, Hamburg Germany.

Mike Stockle, Tina Knight, Impact of Low-Sulphur Bunkers on Refineries, Catalysis 2009, p. 1-7, www.digitalrefining.com/article/1000090, article based on presentation from the Nov. 2008 ERC Annual Meeting, Vienna Austria.

Ekaterina V. Parkhomchuk, Anton I. Lysikov, Alexey G. Okunev, Pavel D. Parunin, Victoria S. Semeikina, Artem B. Ayupov, Valentina A. Trunova, Valentin N. Parmon, Meso / Macroporous CoMo Alumina Pellets for Hydrotreating of Heavy Oil, Industrial & Engineering Chemistry Research, vol. 15 Nov. 13, 2013, pp. 17117-17125 American Chemical Society, Washington DC US.

Cristian J. Calderon Jorge Ancheyta, Modeling of Slurry-Phase Reactors for Hydrocracking of Heavy Oils, Energy & Fuels, vol. 30 Jan. 28, 2016, pp. 2525-2543, American Chemical Society, Washington DC US.

DNV GL Maritime, Notice for Low Sulphur "Hybrid" Fuel Operation, Technical Update No. 3, Mar. 2015, p. 1&2, DNV GL Maritime, Hamburg Germany.

Abdul Waheed Bhutto, Rashid Abro, Shurong Goa, Tauqeer Abbas, Xiaochun Chen, Guangren Yu, Oxidative Desulfurization of Fuel Oils Using Ionic Liquids: A Review, Journal of the Taiwan Institute of Chemical Engineers, vol. 62, Feb. 28, 2016, pp. 84-97, Elsevier B.V. Amsterdam The Netherlands.

I.V. Babich, J.A. Moulijn, Science and Technology of Novel Processes for Deep Desulfurization of Oil Refinery Streams: A Review, Fuel, vol. 82 ,Nov. 14, 2002, pp. 607-631 Elsevier B.V. Amsterdam The Netherlands Published first on the web via fuelfirst.com—http://www.fuelfirst.com.

A. Hauser, A. Marafi, A. Stanislaus, A. Al-Adwani, Relation Between Feed Quality and Coke Formation in a Three Stage Atmospheric Residue Desulfurization (ARDS) Process, Energy & Fuels, vol. 19 Feb. 8, 2005, pp. 544-553, American Chemical Society, Washington DC US.

A Marafi, H. Al-Bazzaz, M. Al-Marri, F. Maruyama, M. Absi-Halbi, A. Stanislaus, Residual-Oil Hydrotreating Kinetics for graded Catalyst Systems: Effect of Original and Treated Feedstocks, Energy Fuels, vol. 17 (5), Jul. 2, 2003 pp. 1191-1197 American Chemical Society, Washington DC US.

Hmaza Al-Bazza, Jia-Lin Kang, Dduha Chehadeh, Dawoud Bahzad, David Shan-Hill Wong, Shi-Shang Jang, Robust Predictions of Catalyst Deactivation of Atmospheric Residual Desulfurization, Energy Fuels, vol. 29, Oct. 21, 2015 pp. 7089-7100 American Chemical Society, Washington DC US.

A.G. Okunev, E.V. Parkhomchuk, A.I. Lysikov, P.D. Parunin, V.S. Semeykina, V.N. Parmon, Catalytic Hydroprocessing of Heavy Oil Feedstocks, Russian Chemical Reviews, vol. 84, Sep. 2015, pp. 981-999, Russian Academy of Sciences and Turpion Ltd. Moscow, Russia.

Ernest Czermanski, Slawomir Drozdziecki, Maciej Matczak, Eugen Spangenberg, Bogusz Wisnicki, Suplphur Regulation—Technology Solutions and Economic Consequences, Institute of Maritime transport and Seaborne Trade, University of Gdansk, 2014, pp. 1-76, University of Gdansk, Gdansk Poland.

Charles Olsen, Brian Watkins, Greg Rosinski, The Challenges of Processing FCC LCO, Catalagram 110 Special Edition, Fall 2011, pp. 6-8, W.R. Grace & Co. Advanced Refining Technologies, Columbus Maryland, US.

Yanzi Jia, Qinghe Yang, Shuling Sun, Hong Nie, Dadong Li, The Influence of Metal Deposits on Residue Hydrodemetallization Catalyst in the Absence and Presence of Coke, Energy Fuels, vol. 30 Feb. 22, 2016 pp. 2544-2554 American Chemical Society, Washington DC US.

James G. Speight, Upgrading Heavy Oils and Residua: The Nature of the Problem, Catalysis on the Energy Scene, 1984, pp. 515-527, Elsevier Science Publishers B.V. Amsterdam, The Netherlands.

Blessing Umana, Nan Zhang, Robin Smith, Development of Vacuum Residue Hydrodesuphurization—Hydrocracking Models and Their Integration with Refinery Hydrogen Networks, Industrial & Engineering Chemistry Research, vol. 55, Jan. 27, 2016, pp. 2391-2406, American Chemical Society, Washington DC US.

Mike Stockle, Tina Knight, Impact of Low Sulphur Bunkers on Refineries, Catalysis, 2009, pp. 1-7, downloaded from website: www.digitalrefining.com/article/1000090.

James G. Speight, The Desulfurization of Heavy Oils and Residua, 2nd Ed. 1999, Chapter 5, pp. 168-205, Marcel Dekker Inc. New York NY US.

James G. Speight, The Desulfurization of Heavy Oils and Residua, 2nd Ed. 1999, Chapter 6, pp. 206-253, Marcel Dekker Inc. New York NY US.

James G. Speight, The Desulfurization of Heavy Oils and Residua, 2nd Ed. 1999, Chapter 8, pp. 302-334, Marcel Dekker Inc. New York NY US.

James G. Speight, The Desulfurization of Heavy Oils and Residua, 2nd Ed. 1999, Chapter 9, pp. 335-385, Marcel Dekker Inc. New York NY US.

Criterion catalyst & technologies LP, Residue Upgrading Using Fixed-Bed Hydroconversion Product Brochure, p. 1 and 2, https://www.digitalrefining.com/data/literature/file/571609022.pdf.

* cited by examiner

MULTI-STAGE PROCESS AND DEVICE FOR REDUCING ENVIRONMENTAL CONTAMINATES IN HEAVY MARINE FUEL OIL

BACKGROUND

There are two basic marine fuel oil types, distillate based marine fuel oil and residual based marine fuel oil. Distillate based marine fuel oil, also known as Marine Gas Oil (MGO) or Marine Diesel Oil (MDO) comprises petroleum fractions separated from crude oil in a refinery via a distillation process. Gasoil (also known as medium diesel) is a petroleum distillate intermediate in boiling range and viscosity between kerosene and lubricating oil containing a mixture of $C_{10}$ to $C_{19}$ aliphatic hydrocarbons. Gasoil is used to heat homes and is used for heavy equipment such as cranes, bulldozers, generators, bobcats, tractors and combine harvesters. Generally maximizing gasoil recovery from residues is the most economic use of the materials by refiners because they can crack gas oils into valuable gasoline and distillates. Diesel oils are very similar to gas oils with diesel containing predominantly contain a mixture of $C_{10}$ to $C_{19}$ hydrocarbons, which include approximately 64% aliphatic hydrocarbons, 1-2% olefinic hydrocarbons, and 35% aromatic hydrocarbons. Marine Diesels may contain up to 15% residual process streams, and optionally up to no more than 5% volume of polycyclic aromatic hydrocarbons (asphaltenes). Diesel fuels are primarily utilized as a land transport fuel and as blending component with kerosene to form aviation jet fuel.

Residual based fuel oils or Heavy Marine Fuel Oil (HMFO) comprises a mixture of process residues—the fractions that don't boil or vaporize even under vacuum conditions, and have an asphaltenes content between 3 and 20 percent by weight. Asphaltenes are large and complex polycyclic hydrocarbons with a propensity to form complex and waxy precipitates. Once asphaltenes have precipitated out, they are notoriously difficult to re-dissolve and are described as fuel tank sludge in the marine shipping industry and marine bunker fueling industry.

Large ocean-going ships have relied upon HMFO to power large two stroke diesel engines for over 50 years. HMFO is a blend of aromatics, distillates, and residues generated in the crude oil refinery process. Typical streams included in the formulation of HMFO include: atmospheric tower bottoms (i.e. atmospheric residues), vacuum tower bottoms (i.e. vacuum residues) visbreaker residue, FCC Light Cycle Oil (LCO), FCC Heavy Cycle Oil (HCO) also known as FCC bottoms, FCC Slurry Oil, heavy gas oils and delayed cracker oil (DCO), polycylic aromatic hydrocarbons, reclaimed land transport motor oils and small portions (less than 20% by volume) of cutter oil, kerosene or diesel to achieve a desired viscosity. HMFO has an aromatic content higher than the marine distillate fuels noted above. The HMFO composition is complex and varies with the source of crude oil and the refinery processes utilized to extract the most value out of a barrel of crude oil. The mixture of components is generally characterized as being viscous, high in sulfur and metal content, and high in asphaltenes making HMFO the one product of the refining process that has a per barrel value less than the feedstock crude oil itself.

Industry statistics indicate that about 90% of the HMFO sold contains 3.5 weight % sulfur. With an estimated total worldwide consumption of HMFO of approximately 300 million tons per year, the annual production of sulfur dioxide by the shipping industry is estimated to be over 21 million tons per year. Emissions from HMFO burning in ships contribute significantly to both global air pollution and local air pollution levels.

MARPOL, the International Convention for the Prevention of Pollution from Ships, as administered by the International Maritime Organization (IMO) was enacted to prevent pollution from ships. In 1997, a new annex was added to MARPOL; the Regulations for the Prevention of Air Pollution from Ships—Annex VI to minimize airborne emissions from ships ($SO_x$, $NO_x$, ODS, VOC) and their contribution to air pollution. A revised Annex VI with tightened emissions limits was adopted in October 2008 having effect on 1 Jul. 2010 (hereafter called Annex VI (revised) or simply Annex VI).

MARPOL Annex VI (revised) established a set of stringent emissions limits for vessel operations in designated Emission Control Areas (ECAs). The ECAs under MARPOL Annex VI (revised) are: i) Baltic Sea area—as defined in Annex I of MARPOL—$SO_x$ only; ii) North Sea area—as defined in Annex V of MARPOL—$SO_x$ only; iii) North American—as defined in Appendix VII of Annex VI of MARPOL—$SO_x$, $NO_x$ and PM; and, iv) United States Caribbean Sea area—as defined in Appendix VII of Annex VI of MARPOL—$SO_x$, $NO_x$ and PM.

Annex VI (revised) was codified in the United States by the Act to Prevent Pollution from Ships (APPS). Under the authority of APPS, the U.S. Environmental Protection Agency (the EPA), in consultation with the United States Coast Guard (USCG), promulgated regulations which incorporate by reference the full text of MARPOL Annex VI (revised). See 40 C.F.R. § 1043.100(a)(1). On Aug. 1, 2012 the maximum sulfur content of all marine fuel oils used onboard ships operating in US waters/ECA cannot exceed 1.00% wt. (10,000 ppm) and on Jan. 1, 2015 the maximum sulfur content of all marine fuel oils used in the North American ECA was lowered to 0.10% wt. (1,000 ppm). At the time of implementation, the United States government indicated that vessel operators must vigorously prepare for the 0.10% wt. (1,000 ppm) US ECA marine fuel oil sulfur standard. To encourage compliance, the EPA and USCG refused to consider the cost of compliant low sulfur fuel oil to be a valid basis for claiming that compliant fuel oil was not available for purchase. For the past five years there has been a very strong economic incentive to meet the marine industry demands for low sulfur HMFO, however technically viable solutions have not been realized. There is an on-going and urgent demand for processes and methods for making a low sulfur HMFO compliant with MARPOL Annex VI emissions requirements.

The Annex VI (revised) also sets global limits on sulfur oxide and nitrogen oxide emissions from ship exhausts and particulate matter and prohibits deliberate emissions of ozone depleting substances, such as hydro-chlorofluorocarbons. Under the revised MARPOL Annex VI, the global sulfur cap for HMFO was reduced to 3.50% wt. effective 1 Jan. 2012; then further reduced to 0.50% wt, effective 1 Jan. 2020. This regulation has been the subject of much discussion in both the marine shipping and marine fuel bunkering industry. Under the global limit, all ships must use HMFO with a sulfur content of not over 0.50% wt. The IMO has repeatedly indicated to the marine shipping industry that notwithstanding availability of compliant fuel or the price of compliant fuel, compliance with the 0.50% wt. sulfur limit for HMFO will occur on 1 Jan. 2020 and that the IMO expects the fuel oil market to solve this requirement. There has been a very strong economic incentive to meet the international marine industry demands for low sulfur HMFO, however technically viable solutions have not been realized. There is an on-going and urgent demand for processes and methods for making a low sulfur HMFO compliant with MARPOL Annex VI emissions requirements.

IMO Regulation 14 provides both the limit values and the means to comply. These may be divided into methods termed primary (in which the formation of the pollutant is avoided) or secondary (in which the pollutant is formed but removed prior to discharge of the exhaust gas stream to the atmosphere). There are no guidelines regarding any primary methods (which could encompass, for example, onboard blending of liquid fuel oils or dual fuel (gas/liquid) use). In secondary control methods, guidelines (MEPC.184(59)) have been adopted for exhaust gas cleaning systems; in using such arrangements there would be no constraint on the sulfur content of the fuel oils as bunkered other than that given by the system's certification. For numerous technical and economic reasons, secondary controls have been rejected by major shipping companies and not widely adopted in the marine shipping industry. Using secondary controls is not seen as practical solution by the marine shipping industry.

Primary Control Solutions:

A focus for compliance with the MARPOL requirements has been on primary control solutions for reducing the sulfur levels in marine fuel components prior to combustion based on the substitution of HMFO with alternative fuels. However, the switch from HMFO to alternative fuels poses a range of issues for vessel operators, many of which are still not understood by either the shipping industry or the refining industry. Because of the potential risks to ships propulsion systems (i.e. fuel systems, engines, etc.) when a ship switches fuel, the conversion process must be done safely and effectively to avoid any technical issues. However, each alternative fuel has both economic and technical difficulties adapting to the decades of shipping infrastructure and bunkering systems based upon HMFO utilized by the marine shipping industry.

LNG:

The most prevalent primary control solution in the shipping industry is the adoption of LNG as a primary or additive fuel to HMFO. An increasing number of ships are using liquified natural gas (LNG) as a primary fuel. Natural gas as a marine fuel for combustion turbines and in diesel engines leads to negligible sulfur oxide emissions. The benefits of natural gas have been recognized in the development by IMO of the International Code for Ships using Gases and other Low Flashpoint Fuels (the IGF Code), which was adopted in 2015. LNG however presents the marine industry with operating challenges including: onboard storage of a cryogenic liquid in a marine environment will require extensive renovation and replacement of the bunker fuel storage and fuel transfer systems of the ship; the supply of LNG is far from ubiquitous in major world ports; updated crew qualifications and training on operating LNG or duel fuel engines will be required prior to going to sea.

Sulfur Free Bio-Fuels:

Another proposed primary solution for obtaining compliance with the MARPOL requirements is the substitution of HMFO with sulfur free bio-fuels. Bio-diesel has had limited success in displacing petroleum derived diesel however supply remains constrained. Methanol has been used on some short sea services in the North Sea ECA on ferries and other littoral ships. The wide spread adoption of bio-fuel, such as bio-diesel or methanol, present many challenges to ship owners and the bunker fuel industry. These challenges include: fuel system compatibility and adaptation of existing fuel systems will be required; contamination during long term storage of methanol and biodiesel from water and biological contamination; the heat content of methanol and bio-diesel on a per ton basis is substantially lower than HMFO; and methanol has a high vapor pressure and presents serious safety concerns of flash fires.

Replacement of Heavy Fuel Oil with Marine Gas Oil or Marine Diesel:

A third proposed primary solution is to simply replace HMFO with marine gas oil (MGO) or marine diesel (MDO). The first major difficulty is the constraint in global supply of distillate materials that make up over 90% vol of MGO and MDO. It is reported that the effective spare capacity to produce MGO is less than 100 million metric tons per year resulting in an annual shortfall in marine fuel of over 200 million metric tons per year. Refiners not only lack the capacity to increase the production of MGO, but they have no economic motivation because higher value and higher margins can be obtained from ultra-low sulfur diesel fuel for land-based transportation systems (i.e. trucks, trains, mass transit systems, heavy construction equipment, etc.).

Blending:

Another primary solution is the blending of HMFO with lower sulfur containing fuels such as low sulfur marine diesel (0.1% wt. sulfur) to achieve a Product HMFO with a sulfur content of 0.5% wt. In a straight blending approach (based on linear blending) every 1 ton of HSFO (3.5% wt. sulfur) requires 7.5 tons of MGO or MDO material with 0.1% wt. S to achieve a sulfur level of 0.5% wt. HMFO. One of skill in the art of fuel blending will immediately understand that blending hurts key properties of the HMFO, specifically viscosity and density are substantially altered. Further a blending process may cause a fuel with variable viscosity and density that may no longer meet the requirements for a HMFO.

Further complications may arise when blended HMFO is introduced into the bunkering infrastructure and shipboard systems otherwise designed for unblended HMFO. There is a real risk of incompatibility when the two fuels are mixed. Blending a mostly paraffinic-type distillate fuel (MGO or MDO) with a HMFO having a high aromatic content often correlates with poor solubility of asphaltenes. A blended fuel is likely to result in the precipitation of asphaltenes and/or highly paraffinic materials from the distillate material forming an intractable fuel tank sludge. Fuel tank sludge causes clogging of filters and separators, transfer pumps and lines, build-up of sludge in storage tanks, sticking of fuel injection pumps (deposits on plunger and barrel), and plugged fuel nozzles. Such a risk to the primary propulsion system is not acceptable for a cargo ship in the open ocean.

Lastly blending of HMFO with marine distillate products (MGO or MDO) is not economically feasible. A blender will be taking a high value product (0.1% S marine gas oil (MGO) or marine diesel (MDO)) and blending it 7.5 to 1 with a low value high sulfur HMFO to create a final IMO/MARPOL compliant HMFO (i.e. 0.5% wt. S Low Sulfur Heavy Marine Fuel Oil—LSHMFO). It is expected that LSHMFO will sell at a lower price on a per ton basis than the value of the two blending stocks alone.

Processing of Residual Oil.

For the past several decades, the focus of refining industry research efforts related to the processing of heavy oils (crude oils, distressed oils, or residual oils) has been on upgrading the properties of these low value refinery process oils to create lighter oils with greater value. The challenge has been that crude oil, distressed oil and residues can be unstable and contain high levels of sulfur, nitrogen, phosphorous, metals (especially vanadium and nickel) and asphaltenes. Much of the nickel and vanadium is in difficult to remove chelates with porphyrins. Vanadium and nickel porphyrins and other metal organic compounds are responsible for catalyst contamination and corrosion problems in the refinery. The sulfur, nitrogen, and phosphorous, are removed because they are well-known poisons for the precious metal (platinum and palladium) catalysts utilized in the processes downstream of the atmospheric or vacuum distillation towers.

The difficulties treating atmospheric or vacuum residual streams has been known for many years and has been the subject of considerable research and investigation. Numerous residue-oil conversion processes have been developed in which the goals are same, 1) create a more valuable, preferably distillate range hydrocarbon product; and 2) concentrate the contaminates such as sulfur, nitrogen, phosphorous, metals and asphaltenes into a form (coke, heavy coker residue, FCC slurry oil) for removal from the refinery stream. Well known and accepted practice in the refining industry is to increase the reaction severity (elevated temperature and pressure) to produce hydrocarbon products that are lighter and more purified, increase catalyst life times and remove sulfur, nitrogen, phosphorous, metals and asphaltenes from the refinery stream.

It is also well known in these processes that the nature of the feedstock has a significant influence upon the products produced, catalyst life, and ultimately the economic viability of the process. In a representative technical paper Residual-Oil Hydrotreating Kinetics for Graded Catalyst Systems: Effects of Original and Treated Feedstocks, is stated that "The results revealed significant changes in activity, depending on the feedstock used for the tests. The study demonstrates the importance of proper selection of the feedstocks used in the performance evaluation and screening of candidate catalyst for graded catalyst systems for residual-oil hydrotreatment." From this one skilled in the art would understand that the conditions required for the successful hydroprocessing of atmospheric residue are not applicable for the successful hydroprocessing of vacuum residue which are not applicable for the successful hydroprocessing of a visbreaker residue, and so forth. Successful reaction conditions depend upon the feedstock. For this reason modern complex refineries have multiple hydroprocessing units, each unit being targeted on specific hydrocarbon stream with a focus on creating desirable and valuable light hydrocarbons and providing a product acceptable to the next downstream process.

A further difficulty in the processing of heavy oil residues and other heavy hydrocarbons is the inherent instability of each intermediate refinery stream. One of skill in the art understands there are many practical reasons each refinery stream is handled in isolation. One such reason is the unpredictable nature of the asphaltenes contained in each stream. Asphaltenes are large and complex hydrocarbons with a propensity to precipitate out of refinery hydrocarbon streams. One of skill in the art knows that even small changes in the components or physical conditions (temperature, pressure) can precipitate asphaltenes that were otherwise dissolved in solution. Once precipitated from solution, asphaltenes can quickly block vital lines, control valves, coat critical sensing devices (i.e. temperature and pressure sensors) and generally result in the severe and very costly disruption and shut down of a unit or the whole refinery. It has been a long-standing practice within refineries to not blend intermediate product streams (such as atmospheric residue, vacuum residue, FCC slurry oil, etc. . . . ) and process each stream in separate reactors.

Despite the strong governmental and economic incentives and needs of the international marine shipping industry, refiners have little economic reason to address the removal of environmental contaminates from HMFOs. Instead the global refining industry has been focused upon generating greater value from each barrel of oil by creating light hydrocarbons (i.e. diesel and gasoline) and concentrating the environmental contaminates into increasingly lower value streams (i.e. residues) and products (petroleum coke, HMFO). Shipping companies have focused on short term solutions, such as the installation of scrubbing units, or adopting the limited use of more expensive low sulfur marine diesel and marine gas oils as a substitute for HMFO. There remains a long standing and unmet need for processes and devices that remove the environmental contaminants (i.e. sulfur, nitrogen, phosphorous, metals especially vanadium and nickel) from HMFO without altering the qualities and properties that make HMFO the most economic and practical means of powering ocean going vessels. Further there remains a long standing and unmet need for IMO compliant low sulfur (i.e. 0.5% wt. sulfur) or ultralow (0.10 wt. sulfur) HMFO also compliant with the bulk properties required for a merchantable ISO 8217 HMFO.

SUMMARY

It is a general objective to reduce the environmental contaminates from a Heavy Marine Fuel Oil (HMFO) in a multi stage process that minimizes the changes in the desirable properties of the HMFO and minimizes the unnecessary production of by-product hydrocarbons (i.e. light distillate hydrocarbons having C1-C8 and wild naptha (C5-C20).

A first aspect and illustrative embodiment encompasses a multi-stage process for reducing the environmental contaminants in a Feedstock Heavy Marine Fuel Oil, the process involving: contacting a Feedstock Heavy Marine Fuel Oil with a ionic liquid under extractive desulfurizing conditions to give a pre-treated Feedstock Heavy Marine Fuel Oil; mixing a quantity of the pre-treated Feedstock Heavy Marine Fuel Oil with a quantity of Activating Gas mixture to give a Feedstock Mixture; contacting the Feedstock Mixture with one or more catalysts under desulfurizing conditions to form a Process Mixture from the Feedstock Mixture; receiving the Process Mixture and separating the Product Heavy Marine Fuel Oil liquid components of the Process Mixture from the gaseous components and by-product hydrocarbon components of the Process Mixture and, discharging the Product Heavy Marine Fuel Oil.

A second aspect and illustrative embodiment encompasses a process for reducing the environmental contaminants in HMFO, in which the process involves: mixing a quantity of Feedstock Heavy Marine Fuel Oil with a quantity of Activating Gas mixture to give a Feedstock Mixture; contacting the Feedstock Mixture with one or more catalysts under desulfurizing conditions to form a Process Mixture from the Feedstock Mixture; receiving the Process Mixture and separating the liquid components of the Process Mixture from the bulk gaseous components of the Process Mixture; receiving the liquid components and contacting the liquid components with a ionic liquid under extractive desulfurizing conditions; then separating any residual gaseous components and by-product hydrocarbon components from the Product Heavy Marine Fuel Oil; and, discharging the Product Heavy Marine Fuel Oil.

A third and fourth aspect and illustrative embodiment encompasses a device for reducing environmental contaminants in a Feedstock HMFO and producing a Product HMFO. The illustrative devices embody the above illustrative processes on a commercial scale.

DETAILED DESCRIPTION

The inventive concepts as described herein utilize terms that should be well known to one of skill in the art, however certain terms are utilized having a specific intended meaning and these terms are defined below:

Heavy Marine Fuel Oil (HMFO) is a petroleum product fuel compliant with the ISO 8217 (2017) standards for the bulk properties of residual marine fuels except for the concentration levels of the Environmental Contaminates.

Environmental Contaminates are organic and inorganic components of HMFO that result in the formation of $SO_x$, $NO_x$ and particulate materials upon combustion.

Feedstock HMFO is a petroleum product fuel compliant with the ISO 8217 (2017) standards for the bulk properties of residual marine fuels except for the concentration of Environmental Contaminates, preferably the Feedstock HMFO has a sulfur content greater than the global MARPOL standard of 0.5% wt. sulfur, and preferably and has a sulfur content (ISO 14596 or ISO 8754) between the range of 5.0% wt. to 1.0% wt.

Product HMFO is a petroleum product fuel compliant with the ISO 8217 (2017) standards for the bulk properties of residual marine fuels and achieves a sulfur content lower than the global MARPOL standard of 0.5% wt. sulfur (ISO 14596 or ISO 8754), and preferably a maximum sulfur content (ISO 14596 or ISO 8754) between the range of 0.05% wt. to 1.0% wt.

Activating Gas: is a mixture of gases utilized in the process combined with the catalyst to remove the environmental contaminates from the Feedstock HMFO.

Fluid communication: is the capability to transfer fluids (either liquid, gas or combinations thereof, which might have suspended solids) from a first vessel or location to a second vessel or location, this may encompass connections made by pipes (also called a line), spools, valves, intermediate holding tanks or surge tanks (also called a drum).

Merchantable quality: is a level of quality for a residual marine fuel oil so the fuel is fit for the ordinary purpose it is intended to serve (i.e. serve as a residual fuel source for a marine ship) and can be commercially sold as and is fungible with heavy or residual marine bunker fuel.

Bbl or bbl: is a standard volumetric measure for oil; 1 bbl=0.1589873 $m^3$; or 1 bbl=158.9873 liters; or 1 bbl=42.00 US liquid gallons.

Bpd: is an abbreviation for Bbl per day.

SCF: is an abbreviation for standard cubic foot of a gas; a standard cubic foot (at 14.73 psi and 60 degree F.) equals 0.0283058557 standard cubic meters (at 101.325 kPa and 15 degree Celsius).

Figure 1:
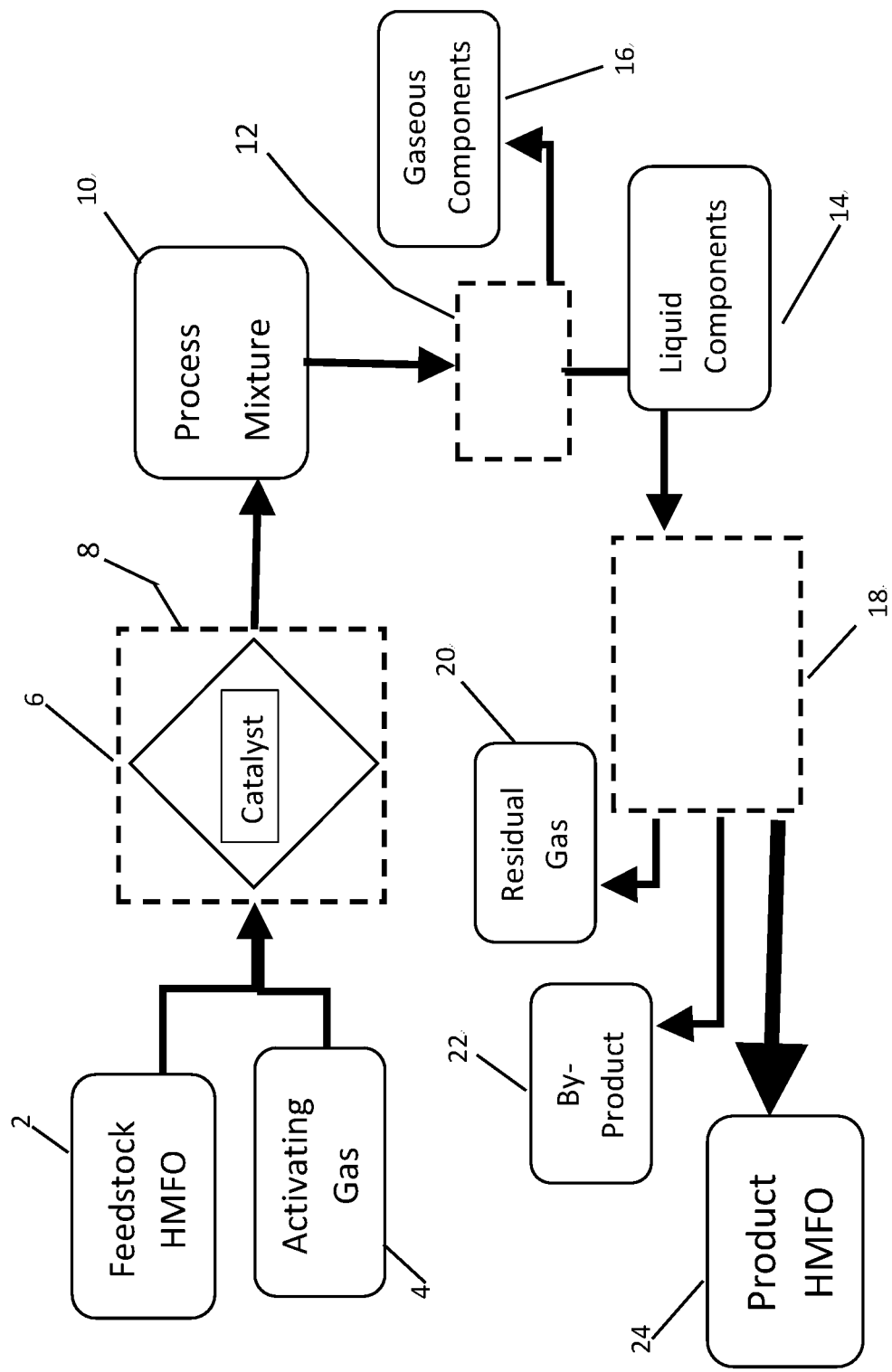
FIG. 1 is a process flow diagram of a core process to produce Product HMFO.

The inventive concepts are illustrated in more detail in this description referring to the drawings, in which FIG. 1 shows the generalized block process flows for a core process of reducing the environmental contaminates in a Feedstock HMFO and producing a Product HMFO. A predetermined volume of Feedstock HMFO (2) is mixed with a predetermined quantity of Activating Gas (4) to give a Feedstock Mixture. The Feedstock HMFO utilized generally complies with the bulk physical and certain key chemical properties for a residual marine fuel oil otherwise compliant with ISO 8217:2017 exclusive of the Environmental Contaminates. More particularly, when the Environmental Contaminate is sulfur, the concentration of sulfur in the Feedstock HMFO may be between the range of 5.0% wt. to 1.0% wt. The Feedstock HMFO should have bulk physical properties required of an ISO 8217:2017 compliant HMFO of: a maximum kinematic viscosity at 50 C (ISO 3104) between the range from 180 $mm^2$/s to 700 $mm^2$/s and a maximum density at 15 C (ISO 3675) between the range of 991.0 $kg/m^3$ to 1010.0 $kg/m^3$ and a CCAI is 780 to 870 and a flash point (ISO 2719) no lower than 60.0° C. Other properties of the Feedstock HMFO connected to the formation of particulate material (PM) include: a maximum total sediment—aged (ISO 10307-2) of 0.10% wt. and a maximum carbon residue—micro method (ISO 10370) between the range of 18.00% wt. and 20.00% wt. and a maximum aluminum plus silicon (ISO 10478) content of 60 mg/kg. Potential Environmental Contaminates other than sulfur that may be present in the Feedstock HMFO over the ISO requirements may include vanadium, nickel, iron, aluminum and silicon substantially reduced by the process of the present invention. However, one of skill in the art will appreciate that the vanadium content serves as a general indicator of these other Environmental Contaminates. In one preferred embodiment the vanadium content is ISO compliant so the Feedstock MHFO has a maximum vanadium content (ISO 14597) between the range from 350 mg/kg to 450 ppm mg/kg.

As for the properties of the Activating Gas, the Activating Gas should be selected from mixtures of nitrogen, hydrogen, carbon dioxide, gaseous water, and methane. The mixture of gases within the Activating Gas should have an ideal gas partial pressure of hydrogen ($p_{H2}$) greater than 80% of the total pressure of the Activating Gas mixture (P) and more preferably wherein the Activating Gas has an ideal gas partial pressure of hydrogen ($p_{H2}$) greater than 95% of the total pressure of the Activating Gas mixture (P). It will be appreciated by one of skill in the art that the molar content of the Activating Gas is another criteria the Activating Gas should have a hydrogen mole fraction in the range between 80% and 100% of the total moles of Activating Gas mixture, more preferably wherein the Activating Gas has a hydrogen mole fraction between 80% and 99% of the total moles of Activating Gas mixture The Feedstock Mixture (i.e. mixture of Feedstock HMFO and Activating Gas) is brought up to the process conditions of temperature and pressure and introduced into a first vessel, preferably a reactor vessel, so the Feedstock Mixture is then contacted with one or more catalysts (8) to form a Process Mixture from the Feedstock Mixture.

The core process conditions are selected so the ratio of the quantity of the Activating Gas to the quantity of Feedstock HMFO is 250 scf gas/bbl of Feedstock HMFO to 10,000 scf gas/bbl of Feedstock HMFO; and preferably between 2000 scf gas/bbl of Feedstock HMFO 1 to 5000 scf gas/bbl of Feedstock HMFO more preferably between 2500 scf gas/bbl of Feedstock HMFO to 4500 scf gas/bbl of Feedstock HMFO. The process conditions are selected so the total pressure in the first vessel is between of 250 psig and 3000 psig; preferably between 1000 psig and 2500 psig, and more preferably between 1500 psig and 2200 psig The process conditions are selected so the indicated temperature within the first vessel is between of 500 F to 900 F, preferably between 650 F and 850 F and more preferably between 680 F and 800 F The process conditions are selected so the liquid hourly space velocity within the first vessel is between 0.05 oil/hour/m$^3$ catalyst and 1.0 oil/hour/m$^3$ catalyst; preferably between 0.08 oil/hour/m$^3$ catalyst and 0.5 oil/hour/m$^3$ catalyst; and more preferably between 0.1 oil/hour/m$^3$ catalyst and 0.3 oil/hour/m$^3$ catalyst to achieve deep desulfurization with product sulfur levels below 0.1 ppmw.

One of skill in the art will appreciate that the core process conditions are determined to consider the hydraulic capacity of the unit. Exemplary hydraulic capacity for the treatment unit may be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day The core process may utilize one or more catalyst systems selected from the group consisting of: an ebulliated bed supported transition metal heterogeneous catalyst, a fixed bed supported transition metal heterogeneous catalyst, and a combination of ebulliated bed supported transition metal heterogeneous catalysts and fixed bed supported transition metal heterogeneous catalysts. One of skill in the art will appreciate that a fixed bed supported transition metal heterogeneous catalyst will be the technically easiest to implement and is preferred. The transition metal heterogeneous catalyst comprises a porous inorganic oxide catalyst carrier and a transition metal catalyst. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier. The transition metal component of the catalyst is one or more metals selected from the group consisting of group 6, 8, 9 and 10 of the Periodic Table. In a preferred and illustrative embodiment, the transition metal heterogeneous catalyst is a porous inorganic oxide catalyst carrier and a transition metal catalyst, in which the preferred porous inorganic oxide catalyst carrier is alumina and the preferred transition metal catalyst is Ni—Mo, Co—Mo, Ni—W or Ni—Co—Mo The Process Mixture (10) in this core process is removed from the first vessel (8) and from being in contact with the one or more catalyst and is sent via fluid communication to a second vessel (12), preferably a gas-liquid separator or hot separators and cold separators, for separating the liquid components (14) of the Process Mixture from the bulk gaseous components (16) of the Process Mixture. The gaseous components (16) are treated beyond the battery limits of the immediate process. Such gaseous components may include a mixture of Activating Gas components and lighter hydrocarbons (mostly methane, ethane and propane but some wild naphtha) that may have been unavoidably formed as part of the by-product hydrocarbons from the process.

The Liquid Components (16) in this core process are sent via fluid communication to a third vessel (18), preferably a fuel oil product stripper system, for separating any residual gaseous components (20) and by-product hydrocarbon components (22) from the Product HMFO (24). The residual gaseous components (20) may be a mixture of gases selected from the group consisting of: nitrogen, hydrogen, carbon dioxide, hydrogen sulfide, gaseous water, C1-C5 hydrocarbons. This residual gas is treated outside of the battery limits of the immediate process, combined with other gaseous components (16) removed from the Process Mixture (10) in the second vessel (12). The liquid by-product hydrocarbon component, which are condensable hydrocarbons unavoidably formed in the process (22) may be a mixture selected from the group consisting of C5-C20 hydrocarbons (wild naphtha) (naphtha—diesel) and other condensable light liquid (C4-C8) hydrocarbons that can be utilized as part of the motor fuel blending pool or sold as gasoline and diesel blending components on the open market.

The Product HMFO (24) resulting from the core process is discharged via fluid communication into storage tanks beyond the battery limits of the immediate process. The Product HMFO complies with ISO 8217:2017 and has a maximum sulfur content (ISO 14596 or ISO 8754) between the range of 0.05% wt. to 1.0% wt. preferably a sulfur content (ISO 14596 or ISO 8754) between the range of 0.05% wt. ppm and 0.7% wt. and more preferably a sulfur content (ISO 14596 or ISO 8754) between the range of 0.1% wt. and 0.5% wt. The vanadium content of the Product HMFO is also ISO compliant with a maximum vanadium content (ISO 14597) between the range from 350 mg/kg to 450 ppm mg/kg, preferably a vanadium content (ISO 14597) between the range of 200 mg/kg and 300 mg/kg and more preferably a vanadium content (ISO 14597) between the range of 50 mg/kg and 100 mg/kg.

The Feedstock HFMO should have bulk physical properties that are ISO compliant of: a maximum kinematic viscosity at 50 C (ISO 3104) between the range from 180 mm$^2$/s to 700 mm$^2$/s; a maximum density at 15 C (ISO 3675) between the range of 991.0 kg/m$^3$ to 1010.0 kg/m$^3$; a CCAI is in the range of 780 to 870; a flash point (ISO 2719) no lower than 60.0 C a maximum total sediment—aged (ISO 10307-2) of 0.10% wt.; a maximum carbon residue—micro method (ISO 10370) between the range of 18.00% wt. and 20.00% wt., and a maximum aluminum plus silicon (ISO 10478) content of 60 mg/kg.

The Product HMFO will have a sulfur content (ISO 14596 or ISO 8754) between 1% and 10% of the maximum sulfur content of the Feedstock Heavy Marine Fuel Oil. That is the sulfur content of the Product will be reduced by about 80% or greater when compared to the Feedstock HMFO. Similarly, the vanadium content (ISO 14597) of the Product Heavy Marine Fuel Oil is between 1% and 10% of the maximum vanadium content of the Feedstock Heavy Marine Fuel Oil. One of skill in the art will appreciate that the above data indicates a substantial reduction in sulfur and vanadium content indicate a process having achieved a substantial reduction in the Environmental Contaminates from the Feedstock HMFO while maintaining the desirable properties of an ISO compliant HMFO.

As a side note, the residual gaseous component is a mixture of gases selected from the group consisting of:

nitrogen, hydrogen, carbon dioxide, hydrogen sulfide, gaseous water, C1-C5 hydrocarbons. An amine scrubber will effectively remove the hydrogen sulfide content which can then be processed using technologies and processes well known to one of skill in the art. In one preferable illustrative embodiment, the hydrogen sulfide is converted into elemental sulfur using the well-known Claus process. An alternative embodiment utilizes a proprietary process for conversion of the Hydrogen sulfide to hydro sulfuric acid. Either way, the sulfur is removed from entering the environment prior to combusting the HMFO in a ships engine. The cleaned gas can be vented, flared or more preferably recycled back for use as Activating Gas.

The by-product hydrocarbon components are a mixture of C5-C20 hydrocarbons (wild naphtha) (naphtha—diesel) which can be directed to the motor fuel blending pool or sold over the fence to an adjoining refinery or even utilized to fire the heaters and combustion turbines to provide heat and power to the process. These by product hydrocarbons which result from hydrocracking reactions should be less than 10% wt., preferably less than 5% wt. and more preferably less than 2% wt. of the overall process mass balance.

The Product HMFO (24) is discharged via fluid communication into storage tanks beyond the battery limits of the immediate process.

Ionic Liquid Extraction Process:

It will be appreciated by one of skill in the art, that the conditions utilized in the core process have been intentionally selected to minimize cracking of hydrocarbons, but remove significant levels of sulfur from the Feedstock HMFO. However, one of skill in the art will also appreciate there may be certain "hard sulfur" compounds present in the Feedstock HMFO removal of which would require elevated temperatures, increased hydrogen pressures, longer residence times for removal all of which would cause cracking of hydrocarbons and an adverse impact upon the desirable bulk properties of the Product HMFO. Process and systems for the removal of these "hard sulfur" compounds may have to achieve an ultra-low sulfur (i.e. sulfur content (ISO 14596 or ISO 8754) less than 0.1% wt. and preferably lower than 0.05% wt. sulfur content (ISO 14596 or ISO 8754)) Product HMFO. These processes and systems must achieve this without substantially altering the desirable bulk properties (i.e. compliance with ISO 8217:2017 exclusive of sulfur content) of the Product HMFO.

Figure 2:
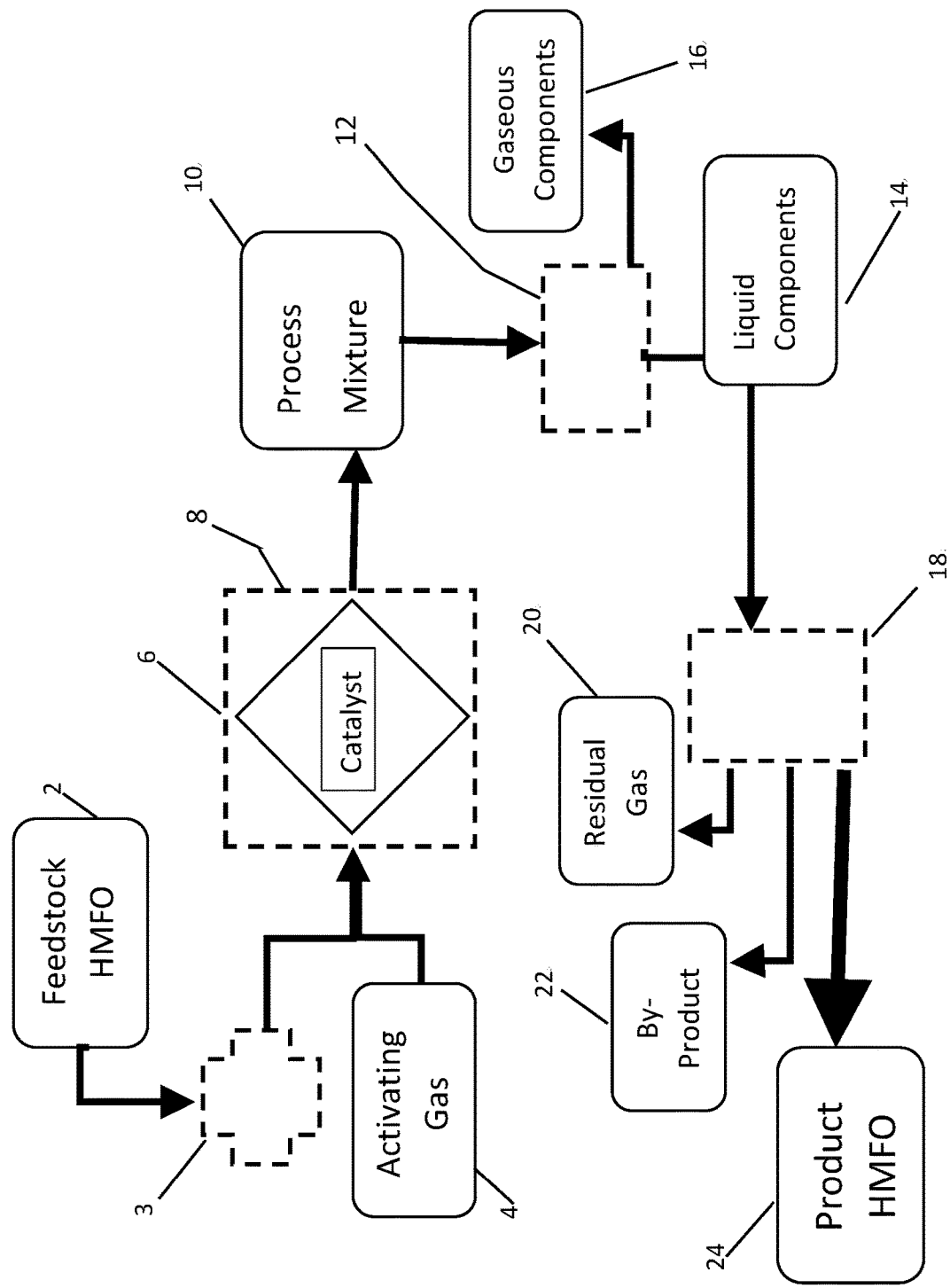
FIG. 2 is a process flow diagram of a multistage process utilizing an ionic liquid extraction process to pre-treat the feedstock HMFO and a later core process to produce Product HMFO.

In this description, items already described above as part of the core process have retained the same numbering and designation for ease of description. As shows in FIG. 2, a ionic liquid extraction unit 3 can be utilized to pre-treat the Feedstock HMFO prior to mixing with the Activating Gas 4 as part of the core process disclosed above. While simplistically represented in this drawing, the ionic liquid extraction unit 3 may be complex and comprise multiple contacting stages however the ionic liquid extraction unit may be as simple as a single flow through/contact reactor vessel in which the HMFO simply contacts/flows over the ionic liquid. While a single flow through/contact vessel may be used, it may be advantageous and it is preferable to have multiple contact vessels in parallel with each other to allow for one unit to be active while a second or third unit are being reloaded with ionic liquid material. Such an arrangement involving multiple parallel contact vessels with pipes/switching valves, etc. . . . is well within the abilities of one of skill in the art of refinery process design and operation.

Turning now to the ionic liquid extraction process itself, generally, ionic liquid matrials are non-aqueous, organic salts composed of a cation and an anion. These materials have relatively low melting points when compared to ionic solids (such a table salt or other common ionic solids), often below 100° C., undetectable vapor pressure, and good chemical and thermal stability. The cationic charge of the salt is localized over hetero atoms, such as nitrogen, phosphorous, and sulfur and the anions may be any inorganic, organic, or organometallic species. The benefits of the ionic liquid extraction technology here described are very mild process conditions (i.e. conditions that do not alter the bulk properties of the ISO 8217 2017 compliant feedstock HMFO), high efficiency in removal of environmental contaminates (i.e. organosulfur compounds, organonitrogen compounds and organometallic compounds (metal porphyrins)), and an environmental benign process.

The ionic liquid can be selected from the group liquid and semi-liquid salts having the general formula Q+A wherein Q+(also known as the cationic component) for example quaternary ammonium cations and quaternary phosphonium cations and A− represents the anionic component which may be any anion that forms a liquid or semi-liquid salt at or below the temperature used in the contracting step which should be preferably below 300° C. and more preferably below about 100° C. A wide range of ionic liquids can be utilized in the ionic liquid extraction process disclosed.

In one such illustrative embodiment, the ionic liquid can have a cationic component selected from an alkyl pyridinium cation, a di-alkyl imidazolium cation, a tri-alkyl imidazolium cation and a tri-alkyl amine cation, and an anion selected from the group consisting of a halide anion, nitrate anions, a triflate anion, a hexafluorophosphate anion, a tetrafluoroborate anion, a halogenoaluminate anion, an organohalogenoaluminate anion, an organogallate anion, an organohalogenogallate anion and mixtures thereof. An ionic liquid may be N-butylpyridnium hexafluorophosphate, N-ethylpyridinium tetrafluoroborate, tetrabutylphosphonium tetrafluoroborate, 1-butyl-3-methylimidazolium tetrafluoroborate, 1-butyl-3-methylimidazolium hexafluoroantimonate, 1-butyl-3-methylimidazolium hexafluorophosphate, 1-ethyl-3-methylimidazolium hexafluorophosphate, 1-ethyl-3-methylimidazolium triflate, 1-butyl-3-methylimidazolium trifluoromethylsulfonate, pyridinium fluorosulfonate, 1-butyl-3-methylimidazolium tetrachloroaluminate, trimethylphenyl-ammonium hexafluorophosphate or trimethyl amine tetrachloroaluminate. The ionic liquid is preferably less than about 10% miscible in the HMFO material.

In one embodiment, the cationic component is selected so it has a large or long chain organic components. Examples of such cationic components include for example and without limitation, from cocoalkylpentaethoxymethylammonium, $(C_{12}-C_{18})$Alkylpoly(3)oxyethldihydroxy-ethylmethylammonium, trimethylphenylammonium, methyltrioctylammonium, benzyldimethyltetradecylammonium, tetrabutylphosphonium, trihexyl(tetradecyl)phosphonium, 3-butyl-1-methylimidazolium, 3-ethyl-1-methylimidazolium, N-butyl-pyridinium, N-ethylpyridinium, diethylpyrazolium, 1-ethyl-3-methylimidazolium, 1-butyl-3-methylimidazolium, 1-hexyl-3-methylimidazolium, 1-octyl-3-methylimidazolium, 1-decyl-3-methylimidazolium, 1-butyl-4-methylpyridinium, 1-butyl-3-methylpyridinium, 1-butyl-2-methylpyridinium, 1-butylpyridinium, 1-butylmethylimidazolium, nonylmethylimidazolium, butylmethylimidazolium, hexylmethylimidazolium, octylmethylimidazolium, 4-methylbutylpyridinium, triethylammonium, trieethylmethylammonium, butylmethylpyridinium, propylammonium, methylmethylimidazolium, ethylmethylimidazolium, butylmethylimidazolium and butylmethylimidazolium.

In another embodiment, the ionic liquid consists essentially of imidazolium ionic liquids, pyridinium ionic liquids, phosphonium ionic liquids, lactamium ionic liquids, ammonium ionic liquids, pyrrolidinium ionic liquids, and combinations thereof. In still another embodiment, the ionic liquid is selected from the group consisting of imidazolium ionic liquids, pyridinium ionic liquids, phosphonium ionic liquids, lactamium ionic liquids, ammonium ionic liquids, pyrrolidinium ionic liquids, and combinations thereof. Imidazolium, pyridinium, lactamium, ammonium, and pyrrolidinium ionic liquids have a cation comprising at least one nitrogen atom. Phosphonium ionic liquids have a cation comprising at least one phosphorous atom.

In another embodiment, a phosphonium ionic liquid, such as those disclosed in U.S. Pat. No. 9,068,127 (incorporated herein by reference) may be utilized and selected from at least one of these ionic liquids: tetraalkylphosphonium dialkylphosphates, tetraalkylphosphonium dialkyl phosphinates, tetraalkylphosphonium phosphates, tetraalkylphosphonium tosylates, tetraalkylphosphonium sulfates, tetraalkylphosphonium sulfonates, tetraalkylphosphonium carbonates, tetraalkylphosphonium metalates, oxometalates, tetraalkylphosphonium mixed metalates, tetraalkylphosphonium polyoxometalates, and tetraalkylphosphonium halides. In another embodiment, the VGO-immiscible phosphonium ionic liquid comprises at least one of trihexyl(tetradecyl)phosphonium chloride, trihexyl(tetradecyl)phosphonium bromide, tributyl(methyl)phosphonium bromide, tributyl(methyl)phosphonium chloride, tributyl(hexyl)phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl(methyl)phosphonium tosylate, tributyl(methyl)phosphonium methylsulfate, tributyl(ethyl)phosphonium diethylphosphate, and tetrabutylphosphonium methanesulfonate.

Additional examples of suitable ionic liquids that may be useful in the extraction of environmental contaminates form HMFO include, but are not limited to 1-butyl-3-methylimidazolium chloride, 1-butyl-3-methylimidazolium trifluoromethanesulfonate, 1-butyl-4-methylpyridinium chloride, N-butyl-3-methylpyridinium methylsulfate, trihexyl(tetradecyl)phosphonium chloride, trihexyl(tetradecyl)phosphonium bromide, tributyl(methyl)phosphonium bromide, tributyl(methyl)phosphonium chloride, tributyl(hexyl)phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl (methyl)phosphonium tosylate, tributyl(ethyl)phosphonium diethylphosphate, tetrabutylphosphonium methanesulfonate, Besides those listed above, suitable anions for the ionic liquid may further include, but are not limited to, phosphates (including alkyl phosphates), phosphinates (including alkyl phosphinates), sulfates, sulfonates, carbonates, metalates, oxometalates (including polyoxometalates and mixed metalates), halides, tosylates, imides, borates, nitrates, and nitrites.

In one embodiment, the ionic liquid can be one or more of 1-ethyl-3-methylimidazolium ethyl sulfate, 1-butyl-3-methylimidazolium hydrogen sulfate, 1-ethyl-3-methylimidazolium chloride, 1-butyl-3-methylimidazolium chloride, 1-butyl-3-methylimidazolium trifluoromethanesulfonate, 1-ethyl-3-methylimidazolium bis(trifluoromethylsulfonyl) imide, 1-butyl-3-methylimidazolium hexafluorophosphate, 1-butyl-3-methylimidazolium tetrafluoroborate, methylimidazolium trifluoroacetate, 1-butyl-3-methylimidazolium bromide, 1-ethyl-3-methylimidazolium trifluoroacetate, 1-methylimidazolium hydrogen sulfate, 1-butyl-4-methylpyridinium chloride, N-butyl-3-methylpyridinium methylsulfate, 1-butyl-4-methypyridinium hexafluorophosphate, pyridinium p-toluene sulfonate, 1-butylpyridinium chloride, tetraethyl-ammonium acetate, trihexyl(tetradecyl)phosphonium chloride, trihexyl(tetradecyl)phosphonium bromide, tributyl(methyl)phosphonium bromide, tributyl(methyl) phosphonium chloride, tributyl(hexyl)phosphonium bromide, tributyl(hexyl)phosphonium chloride, tributyl(octyl) phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl(methyl)phosphonium tosylate, tributyl(ethyl)phosphonium diethylphosphate, tetrabutylphosphonium methanesulfonate, pyridinium p-toluene sulfonate, tributyl(methyl)phosphonium methylsulfate.

Lactamium ionic liquids include, but are not limited to, those described in U.S. Pat. No. 8,709,236, U.S. application Ser. No. 14/271,308, entitled Synthesis of Lactam Based Ionic Liquids, filed May 6, 2014, and U.S. application Ser. No. 14/271,319, entitled Synthesis ofN-Derivatized Lactam Based Ionic Liquids, filed May 6, 2014, which are incorporated by reference.

Besides the ionic liquid, an alkylating agent may be present to help polarize the sulfur and nitrogen containing compounds and expedite the extraction process into the ionic liquid. This systems is described in U.S. Pat. No. 7,198,712 (incorporated herein by reference, however it is believed that an alkylation agent such as those described will cause side reactions and the formation of intractable polymeric sludge materials in the HMFO material. The selection and use of any alkylation agent must be carefully tailored to the specific properties and blend of material present in the HMFO feedstock. Systematic trial and error testing and followed by optimization by one of skill in the art will be needed to find the most effective alkylation agent for this purpose.

The ionic liquid may be deposited on an inorganic support. "Inorganic support" here means a support that comprises an inorganic material. Suitable inorganic materials may include, for example, activated carbon, oxides, carbides, nitrides, hydroxides, carbonitrides, oxynitrides, borides, silicates, or borocarbides. In one embodiment, the inorganic support will be a porous material having an average pore diameter of between 0.5 nm and 100 nm. In one embodiment, the pores of the support material should have an average pore diameter of between 0.5 nm and 50 nm. In one embodiment, the pores of the support material will have an average pore diameter of between 0.5 nm and 20 nm. The porous support material has a pore volume of between 0.1 and 3 $cm^3/g$. Suitable materials include inorganic oxides and molecular sieves with 8, 10, and 12-rings, silica, alumina, silica-alumina, zirconia, titanium oxide, magnesium oxide, thorium oxide, beryllium oxide, activated carbon and mixtures thereof. Example of molecular sieves include 13X, zeolite-Y, USY, ZSM-5, ZSM-22, ZSM-23, ZSM-35, ZSM-48, MCM-22, MCM-35, MCM-58, SAPO-5, SAPO-11, SAPO-35, VPI-5. In one embodiment activated carbon may be the support material, the carbon support can have a BET surface area of between 200 m$^2$/g and 3000 m$^2$/g. In another embodiment, the carbon support will have a BET surface area of between 500 m$^2$/g and 3000 m$^2$/g. In another embodiment, the carbon support will have a BET surface area of between 800 m$^2$/g and 3000 m$^2$/g. In another embodiment a support material may be selected from silica, alumina, silica-alumina, clay and mixtures thereof, the support should have a BET surface area of between 50 m$^2$/g and 1500 m$^2$/g. In another embodiment, when the support selected from silica, alumina, clay and mixtures thereof will have a BET surface area of between 150 m$^2$/g and 1000 m$^2$/g. In another embodiment, when the support selected from silica, alumina, clay and mixtures thereof should have a BET surface area of between 200 m$^2$/g and 800 m$^2$/g.

Deposition of the organic heterocyclic salts on the support can be carried out in various ways including, but not limited to, impregnation, grafting, polymerization, co-precipitation, sol gel method, encapsulation or pore trapping. In one method, the support material is impregnated with an organic heterocyclic salt diluted with an organic solvent, such as acetone. The impregnation followed by the evaporation of the solvent results in a uniform and thin organic heterocyclic salt layer on the support material. When organic heterocyclic salts prepared in such a manner are used in a liquid phase process, a bulk solvent miscible with the organic heterocyclic salt is chosen.

The process for removing sulfur and/or nitrogen contaminants from a HMFO feed stream comprising a contacting step and a separating step. In the contacting step, a HMFO feed, a HMFO-immiscible ionic liquid or combination of ionic liquids or supported ionic liquids are mixed or otherwise brought into contact with each other. The contacting step may facilitate transfer or extraction of the one or more contaminants from the HMFO feed stream to the ionic liquid. Although an ionic liquid partially soluble in the HMFO may facilitate transfer of the contaminant from the HMFO to the ionic liquid, partial solubility may not be required. HMFO/ionic liquid mixtures may have sufficient interfacial surface area between the HMFO and ionic liquid to be useful. Insoluble HMFO/ionic liquid mixtures will be of great benefit in the separation step, because the mixture of HMFO and ionic liquid settles or forms two phases quickly. When a support is utilized for the ionic liquid, the separation process is greatly simplified; for example, the ionic liquid/support material can separate by gravity, centrifugation or the ionic liquid/solid material can be pelletized and used in a traditional fixed bed manner.

In an embodiment, a de-emulsifier may be added to the contacting step and/or the separation step to facilitate or enable the phase separation of the HMFO and the ionic liquid, for example, when contacting or mixing the HMFO and ionic liquid forms or would otherwise form an emulsion. In an embodiment, the de-emulsifier will be added to the contacting step simultaneously with the HMFO and/or ionic liquid. The optional de-emulsifier addition step may be used after an emulsion has formed. De-emulsifiers suitable for the invention can be any demulsifiers utilized in the oil field for breaking emulsions such as ethoxylated and/or propoxylated polyamines, di-epoxides or polyols. Examples of such de-emulsifiers include alcohol-based de-emulsifiers available from Baker Petrolite Corporation such as BPR27120, BPR27140, BPR23025 and BPR27330. In an embodiment, the weight ratio de-emulsifier to HMFO feed will range from about 1:10,000 to about 1:1000. In another embodiment, the weight ratio of de-emulsifier to HMFO feed will range from about 1:1000 to about 1:10.

The process may be conducted in various equipment well known in the art and is suitable for batch or continuous operation. For example, in a small-scale form of the invention, the HMFO, and the HMFO-immiscible ionic liquid may be mixed in a beaker, flask, or other vessel, e.g., by stirring, shaking, use of a mixer, or a magnetic stirrer. The mixing or agitation is stopped, and the mixture forms a HMFO phase and a ionic liquid phase which can be separated, for example, by decanting, centrifugation, or use of a pipette to produce a HMFO effluent having a lower contaminant content relative to the incoming HMFO. The process also produces a ionic liquid effluent comprising the one or more contaminants.

The contacting and separating steps may be repeated, for example, when the contaminant content of the HMFO effluent is to be reduced further to obtain a desired contaminant level in the ultimate HMFO product stream from the process. Equipment items may include, for example, one or more vessels, heaters, separators, exchangers, conduits, pumps, compressors, and controllers. And an equipment item can further include one or more contacting and separating steps. The contaminant removal process or step could be conducted in a similar manner and with similar equipment as used to conduct other liquid-liquid wash and extraction operations. Suitable equipment includes, for example, columns with: trays, packing, rotating discs or plates, and static mixers. Pulse columns and mixing/settling tanks could also be used.

Water in the HMFO/ionic liquid mixture during the contaminant removal step may affect the contaminant removed and/or phase separation. When excess water is present, the ionic liquid is less effective, and the lifetime will be shortened. The HMFO ionic liquid mixture should have a water content of less than about 1 mol % per mol of the ionic liquid, or less than about 0.5 mol %, or less than about 0.2 mol %, or less than about 0.1 mol %, or less than about 0.075 mol %, or less than about 0.05 mol %. In a further embodiment, the HMFO ionic liquid mixture is water free, i.e., the mixture does not contain water.

The contacting step typically takes place at atmospheric pressure, although higher or lower pressures could be used, if desired. The pressure can be about 100 kPa(g) to about 3 MPa(g). Temperature of the contacting step should ensure that the HMFO remains sufficiently fluid like to allow the contacting process to that place. The temperature profile will match that the viscosity curve of HMFO so the temperature of the contacting process should be about 50° C. to about 500° C., and preferably 100° C. to 300° C.

The weight ratio of HMFO feed to lean ionic liquid (or lean ionic liquid and ionic liquid) introduced to the contaminant removal step may range from about 1:10,000 to about 10,000:1, or about 1:1,000 to about 1,000:1, or about 1:100 to about 100:1, or about 1:20 to about 20:1, or about 1:10 to about 10:1, or about 1:1 to about 1:1,000. In an embodiment, the weight of HMFO feed is greater than the weight of ionic liquid introduced to the contaminant removal step.

The contacting time will obtain good contact between the ionic liquid and the HMFO feed. The contacting time is typically about 1 min to about 2 hr, or about 1 min to about 1 hr, or about 5 min to about 30 min. The settling time may range from about one minute to about eight hours.

An optional HMFO washing step may be used, for example, to remove ionic liquid entrained or otherwise remains in the HMFO effluent stream by using water to dissolve the ionic liquid in the HMFO effluent. The HMFO washing step may be conducted in a similar manner and with similar equipment as used to conduct other liquid-liquid wash and extraction operations as discussed above. Various HMFO washing step equipment and conditions such as temperature, pressure, times, and solvent to feed ratio may be the same as or different from the contaminant removal zone equipment and conditions.

The general objective of the ionic liquid extraction process is to remove or at least reduce the sulfur content of the HMFO without negatively affecting the desirable bulk physical properties of the HMFO material. For example if an ISO 8217: 2017 compliant HMFO material (except for environmental contaminates) is subjected to the ionic liquid extraction process, the resulting HMFO product should also be ISO 8217: 2017 compliant material. One of skill in the art will appreciate that even the partial removal of the environmental contaminates by the ionic liquid extraction process will allow for less severe condition in the core desulfurization process disclosed.

Turning back to FIG. 2, when the ionic liquid material are contacted with the HMFO feedstock in an ionic liquid extraction unit 3 under desulfurization conditions, sulfur compounds, particularly organosulfur compounds, and some organonitrogen compounds present are removed from the HMFO. When using an ionic liquid extraction process the HMFO effluent from ionic liquid extraction unit 3 need not have all or even substantially all of the sulfur compounds in the HMFO feed removed. Rather the concept is remove at least a portion of the sulfur compounds to reduce the overall sulfur load on the later process units. In this way one may achieve a level of sulfur reduction for a HMFO not achieved while minimizing the cracking of hydrocarbons and maintaining the desirable bulk properties of the HMFO. In one illustrative embodiment, the HMFO effluent from ionic liquid extraction unit 3 preferably contains less than about 90 weight percent of the sulfur in the HMFO feed charged to ionic liquid extraction unit 3, more preferably less than about 75 weight percent of the sulfur in the HMFO feed, and most preferably less than 50 weight percent of the sulfur in the HMFO feed.

Figure 3:
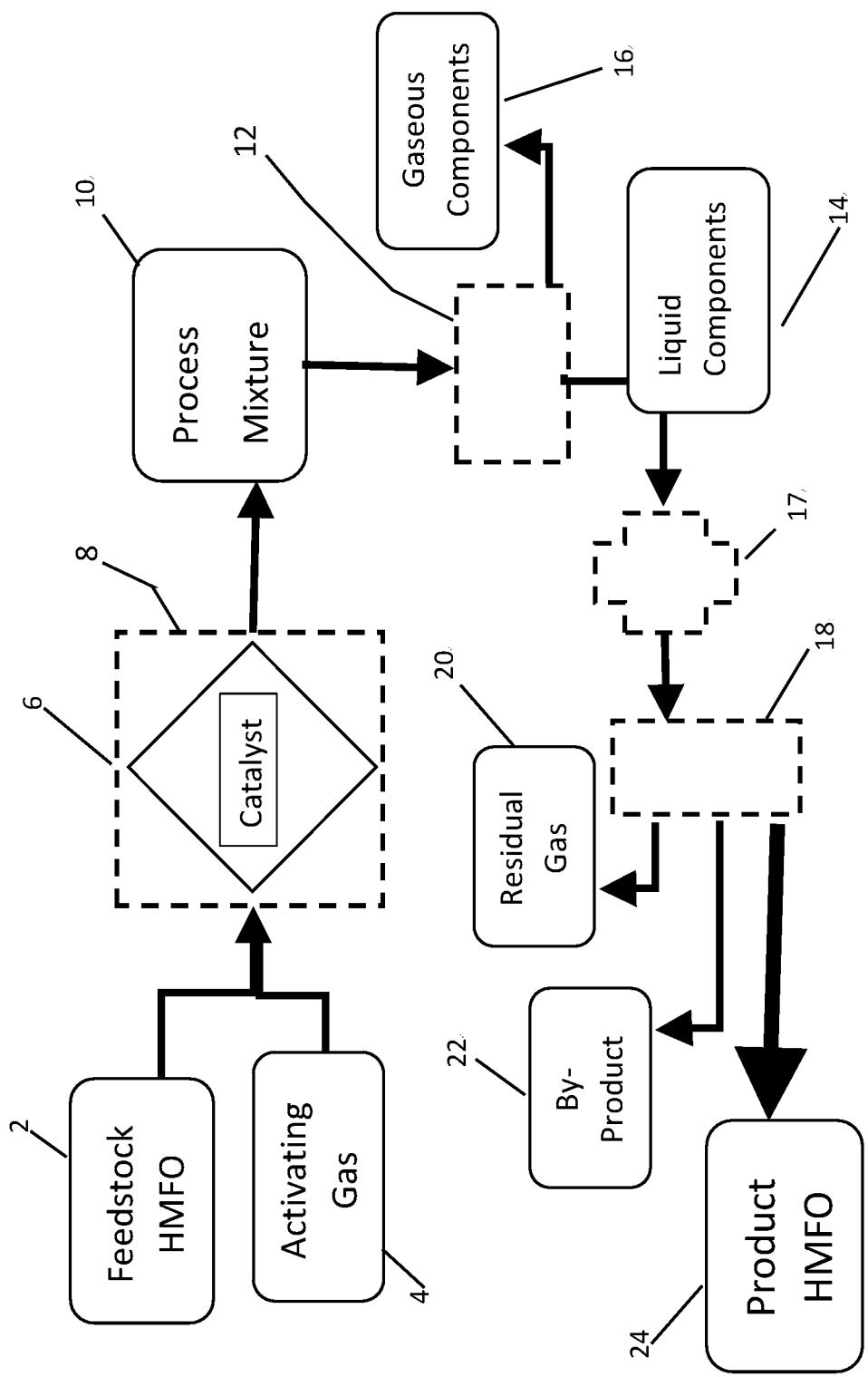
FIG. 3 is a process flow diagram of a multi-stage process utilizing a core process followed by a later ionic liquid extraction process to produce Product HMFO.

An alternative illustrative embodiment is shown in FIG. 3 in which a ionic liquid extraction unit 17 is utilized after the core sulfur removal process step, but prior to the separation of the Product HMFO 24 from any Residual Gas 20 and By-Product 22 (i.e. mostly C1-C4 hydrocarbons, and wild naphtha). In such a configuration the ionic liquid extraction unit effectively acts as a polishing unit to remove "hard sulfur" compounds present in the HMFO not removed under the conditions in the core sulfur removal process step. As with the pre-treatment ionic liquid extraction unit described above, the conditions in this post-treatment ionic liquid extraction unit are moderate and do not result in cracking of hydrocarbons. It is believed that because this step of the process is conducted under very modest conditions (i.e. moderately elevated temperatures sufficient to make the HMFO liquid-like) the ionic liquid materials used in this process will have minimal to no impact upon the bulk physical properties of the product HMFO. In this way one may achieve a level of sulfur reduction for a HMFO not achieved while minimizing the cracking of hydrocarbons and maintaining the desirable bulk properties of the HMFO. In one illustrative embodiment, the HMFO effluent from ionic liquid extraction unit 17 preferably contains less than about 90 weight percent of the sulfur in the HMFO feed charged to ionic liquid extraction unit 17, more preferably less than about 75 weight percent of the sulfur in the HMFO feed, and most preferably less than 50 weight percent of the sulfur in the HMFO feed.

Product HMFO The Product HFMO resulting from the disclosed illustrative process is of merchantable quality for sale and use as a heavy marine fuel oil (also known as a residual marine fuel oil or heavy bunker fuel) and exhibits the bulk physical properties required for the Product HMFO to be an ISO compliant (i.e. ISO 8217:2017) residual marine fuel oil exhibiting the bulk properties of: a maximum kinematic viscosity at 50 C (ISO 3104) between the range from 180 mm$^2$/s to 700 mm$^2$/s; a maximum density at 15 C (ISO 3675) between the range of 991.0 kg/m$^3$ to 1010.0 kg/m$^3$; a CCAI is 780 to 870; a flash point (ISO 2719) no lower than 60.0 C a maximum total sediment—aged (ISO 10307-2) of 0.10% wt.; a maximum carbon residue—micro method (ISO 10370) between the range of 18.00% wt. and 20.00% wt., and a maximum aluminum plus silicon (ISO 10478) content of 60 mg/kg.

The Product HMFO has a sulfur content (ISO 14596 or ISO 8754) less than 0.5 wt % and preferably less than 0.1% wt. and fully complies with the IMO Annex VI (revised) requirements for a low sulfur and preferably an ultra-low sulfur HMFO. That is the sulfur content of the Product HMFO has been reduced by about 90% or greater when compared to the Feedstock HMFO. Similarly, the vanadium content (ISO 14597) of the Product Heavy Marine Fuel Oil is less than 10% and more preferably less than 1% of the maximum vanadium content of the Feedstock Heavy Marine Fuel Oil. One of skill in the art will appreciate that a substantial reduction in sulfur and vanadium content of the Feedstock HMFO indicates a process having achieved a substantial reduction in the Environmental Contaminates from the Feedstock HMFO; of equal importance is this has been achieved while maintaining the desirable properties of an ISO 8217:2017 compliant HMFO.

The Product HMFO not only complies with ISO 8217: 2017 (and is merchantable as a residual marine fuel oil or bunker fuel), the Product HMFO has a maximum sulfur content (ISO 14596 or ISO 8754) between the range of 0.05% wt. to 1.0% wt. preferably a sulfur content (ISO 14596 or ISO 8754) between the range of 0.05% wt. ppm and 0.5% wt. and more preferably a sulfur content (ISO 14596 or ISO 8754) between the range of 0.1% wt. and 0.5% wt. The vanadium content of the Product HMFO is well within the maximum vanadium content (ISO 14597) required for an ISO 8217:2017 residual marine fuel oil exhibiting a vanadium content lower than 450 ppm mg/kg, preferably a vanadium content (ISO 14597) lower than 300 mg/kg and more preferably a vanadium content (ISO 14597) between the range of 50 mg/kg and 100 mg/kg.

One knowledgeable in the art of marine fuel blending, bunker fuel formulations and the fuel logistical requirements for marine shipping fuels will readily appreciate that without further compositional changes or blending, the Product HMFO can be sold and used as a low sulfur MARPOL Annex VI compliant heavy (residual) marine fuel oil that is a direct substitute for the high sulfur heavy (residual) marine fuel oil or heavy bunker fuel in use. One illustrative embodiment is an ISO 8217:2017 compliant low sulfur heavy marine fuel oil comprising (and preferably consisting essentially of) a 100% hydroprocessed ISO 8217:2017 compliant high sulfur heavy marine fuel oil, wherein the sulfur levels of the hydroprocessed ISO 8217:2017 compliant high sulfur heavy marine fuel oil is greater than 0.5% wt. and wherein the sulfur levels of the ISO 8217:2017 compliant low sulfur heavy marine fuel oil is less than 0.5% wt. Another illustrative embodiment is an ISO 8217:2017 compliant ultra-low sulfur heavy marine fuel oil comprising (and preferably consisting essentially of) a 100% hydroprocessed ISO 8217:

2017 compliant high sulfur heavy marine fuel oil, wherein the sulfur levels of the hydroprocessed ISO 8217:2017 compliant high sulfur heavy marine fuel oil is greater than 0.5% wt. and wherein the sulfur levels of the ISO 8217:2017 compliant low sulfur heavy marine fuel oil is less than 0.1% wt.

Because of the present invention, multiple economic and logistical benefits to the bunkering and marine shipping industries can be realized. The benefits include minimal changes to the existing heavy marine fuel bunkering infrastructure (storage and transferring systems); minimal changes to shipboard systems are needed to comply with emissions requirements of MARPOL Annex VI (revised); no additional training or certifications for crew members will be needed, amongst the realizable benefits. Refiners will also realize multiple economic and logistical benefits, including: no need to alter or rebalance the refinery operations and product streams to meet a new market demand for low sulfur or ultralow sulfur HMFO; no additional units are needed in the refinery with accompanying additional hydrogen or sulfur capacity because the illustrative process can be conducted as a stand alone unit; refinery operations can remain focused on those products that create the greatest value from the crude oil received (i.e. production of petrochemicals, gasoline and distillate (diesel); refiners can continue using the existing slates of crude oils without having to switch to sweeter or lighter crudes to meet the environmental requirements for HMFO products.

Heavy Marine Fuel Composition

One aspect of the present inventive concept is a fuel composition comprising, but preferably consisting essentially of, the Product HMFO resulting from the processes disclosed, and may optionally include Diluent Materials. The bulk properties of the Product HMFO itself complies with ISO 8217:2017 and meets the global IMO Annex VI requirements for maximum sulfur content (ISO 14596 or ISO 8754). If ultra-low levels of sulfur are desired, the process of the present invention achieves this and one of skill in the art of marine fuel blending will appreciate that a low sulfur or ultra-low sulfur Product HMFO can be utilized as a primary blending stock to form a global IMO Annex VI compliant low sulfur Heavy Marine Fuel Composition. Such a low sulfur Heavy Marine Fuel Composition will comprise (and preferably consist essentially of): a) the Product HMFO and b) Diluent Materials. In one embodiment, the majority of the volume of the Heavy Marine Fuel Composition is the Product HMFO with the balance of materials being Diluent Materials. Preferably, the Heavy Maine Fuel Composition is at least 75% by volume, preferably at least 80% by volume, more preferably at least 90% by volume, and furthermore preferably at least 95% by volume Product HMFO with the balance being Diluent Materials.

Diluent Materials may be hydrocarbon or non-hydrocarbon based materials mixed into or combined with or added to, or solid particle materials suspended in, the Product HMFO. The Diluent Materials may intentionally or unintentionally alter the composition of the Product HMFO but not so the resulting mixture violates the ISO 8217 (2017) standards for the bulk properties of residual marine fuels or fails to have a sulfur content lower than the global MARPOL standard of 0.5% wt. sulfur (ISO 14596 or ISO 8754). Examples of Diluent Materials considered to be hydrocarbon based materials include: Feedstock HMFO (i.e. high sulfur HMFO); distillate based fuels such as road diesel, gas oil, MGO or MDO; cutter oil (which is used in formulating residual marine fuel oils); renewable oils and fuels such as biodiesel, methanol, ethanol; synthetic hydrocarbons and oils based on gas to liquids technology such as Fischer-Tropsch derived oils, synthetic oils such as those based on polyethylene, polypropylene, dimer, trimer and poly butylene; refinery residues or other hydrocarbon oils such as atmospheric residue, vacuum residue, fluid catalytic cracker (FCC) slurry oil, FCC cycle oil, pyrolysis gasoil, cracked light gas oil (CLGO), cracked heavy gas oil (CHGO), light cycle oil (LCO), heavy cycle oil (HCO), thermally cracked residue, coker heavy distillate, bitumen, de-asphalted heavy oil, visbreaker residue, slop oils, asphaltene oils; used or recycled motor oils; lube oil aromatic extracts and crude oils such as heavy crude oil, distressed crude oils and similar materials that might otherwise be sent to a hydrocracker or diverted into the blending pool for a prior art high sulfur heavy (residual) marine fuel oil. Examples of Diluent Materials considered to be non-hydrocarbon based materials include: residual water (i.e. water absorbed from the humidity in the air or water that is miscible or solubilized, sometimes as microemulsions, into the hydrocarbons of the Product HMFO), fuel additives which can include, but are not limited to detergents, viscosity modifiers, pour point depressants, lubricity modifiers, de-hazers (e.g. alkoxylated phenol formaldehyde polymers), antifoaming agents (e.g. polyether modified polysiloxanes); ignition improvers; anti rust agents (e.g. succinic acid ester derivatives); corrosion inhibitors; anti-wear additives, anti-oxidants (e.g. phenolic compounds and derivatives), coating agents and surface modifiers, metal deactivators, static dissipating agents, ionic and nonionic surfactants, stabilizers, cosmetic colorants and odorants and mixtures of these. A third group of Diluent Materials may include suspended solids or fine particulate materials that are present because of the handling, storage and transport of the Product HMFO or the Heavy Marine Fuel Composition, including but not limited to: carbon or hydrocarbon solids (e.g. coke, graphitic solids, or microagglomerated asphaltenes), iron rust and other oxidative corrosion solids, fine bulk metal particles, paint or surface coating particles, plastic or polymeric or elastomer or rubber particles (e.g. resulting from the degradation of gaskets, valve parts, etc. . . . ), catalyst fines, ceramic or mineral particles, sand, clay, and other earthen particles, bacteria and other biologically generated solids, and mixtures of these that may be present as suspended particles, but otherwise don't detract from the merchantable quality of the Heavy Marine Fuel Composition as an ISO 8217 (2017) compliant heavy (residual) marine fuel.

The blend of Product HMFO and Diluent Materials must be of merchantable quality as a low sulfur heavy (residual) marine fuel. That is the blend must be suitable for the intended use as heavy marine bunker fuel and generally be fungible as a bunker fuel for ocean going ships. Preferably the Heavy Marine Fuel Composition must retain the bulk physical properties required of an ISO 8217 (2017) compliant residual marine fuel oil and a sulfur content lower than the global MARPOL standard of 0.5% wt. sulfur (ISO 14596 or ISO 8754) so that the material qualifies as MARPOL Annex VI Low Sulfur Heavy Marine Fuel Oil (LS-HMFO). The sulfur content of the Product HMFO can be lower than 0.5% wt. (i.e. below 0.1% wt sulfur (ISO 14596 or ISO 8754)) to qualify as a MARPOL Annex VI compliant Ultra-Low Sulfur Heavy Marine Fuel Oil (ULS-HMFO) and a Heavy Marine Fuel Composition likewise can be formulated to qualify as a MARPOL Annex VI compliant ULS-HMFO suitable for use as marine bunker fuel in the ECA zones. To qualify as an ISO 8217 (2017) qualified fuel, the Heavy Marine Fuel Composition of the present invention must meet those internationally accepted standards including: a maximum kinematic viscosity at 50 C (ISO 3104) between the range from 180 mm²/s to 700 mm²/s; a maximum density at 15 C (ISO 3675) between the range of 991.0 kg/m³ to 1010.0 kg/m³; a CCAI is 780 to 870; a flash point (ISO 2719) no lower than 60.0 C a maximum total sediment—aged (ISO 10307-2) of 0.10% wt.; a maximum carbon residue—micro method (ISO 10370) between the range of 18.00% wt. and 20.00% wt., and a maximum aluminum plus silicon (ISO 10478) content of 60 mg/kg.

Production Plant Description: Turning now to a more detailed illustrative embodiment of a production plant implementing both the core process and the ionic liquid extraction processes disclosed herein, FIGS. 4 and 5 show a schematic for a production plant implementing the core process described above combined with a pre-treatment ionic liquid extraction unit (FIG. 4, item 2) or a post-treatment ionic liquid extraction unit (FIG. 5, item 18), the combination which will cause the reduction of the environmental contaminates in a Feedstock HMFO to produce a Product.

It will be appreciated by one of skill in the art that additional alternative embodiments for the core process and the ionic liquid extraction process may involve multiple vessels and reactors even though only one of each is shown. Variations using multiple vessels/reactors are contemplated by the present invention but are not illustrated in greater detail for simplicity sake. The Reactor System (11) for the core process is described in greater detail below and using multiple vessels for the ionic liquid extraction process has been described. It will be noted by one of skill in the art that in FIGS. 4 and 5, portions of the production plant with similar function and operation have been assigned the same reference number. This has been done for convenience and succinctness only and differences between FIG. 4 and FIG. 5 are duly noted and explained below.

Figure 4:
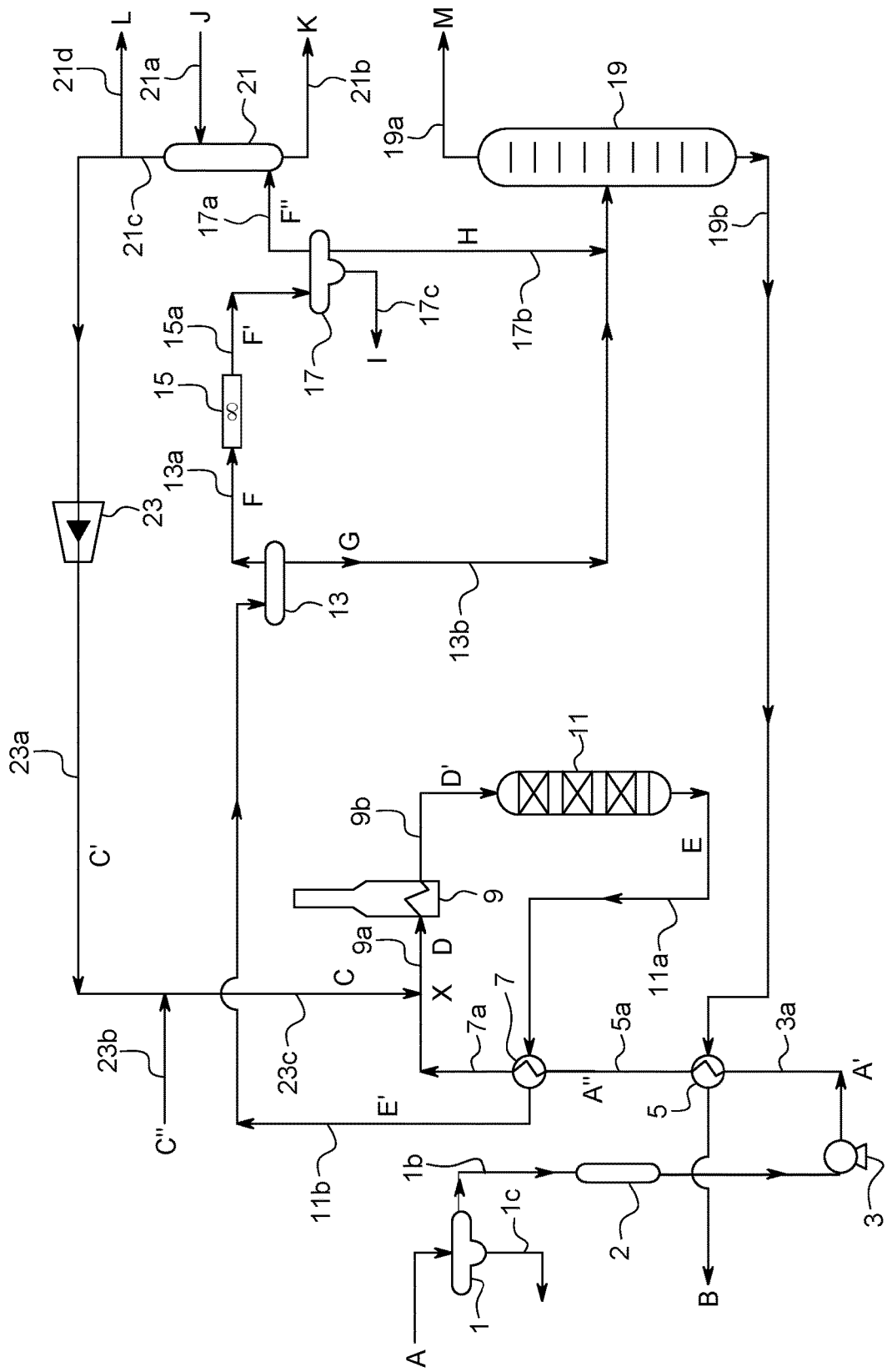
FIG. 4 is a basic schematic diagram of a plant to produce Product HMFO utilizing a combination of an ionic liquid extraction process to pre-treat the feedstock HMFO and a later core process to produce Product HMFO.
Figure 5:
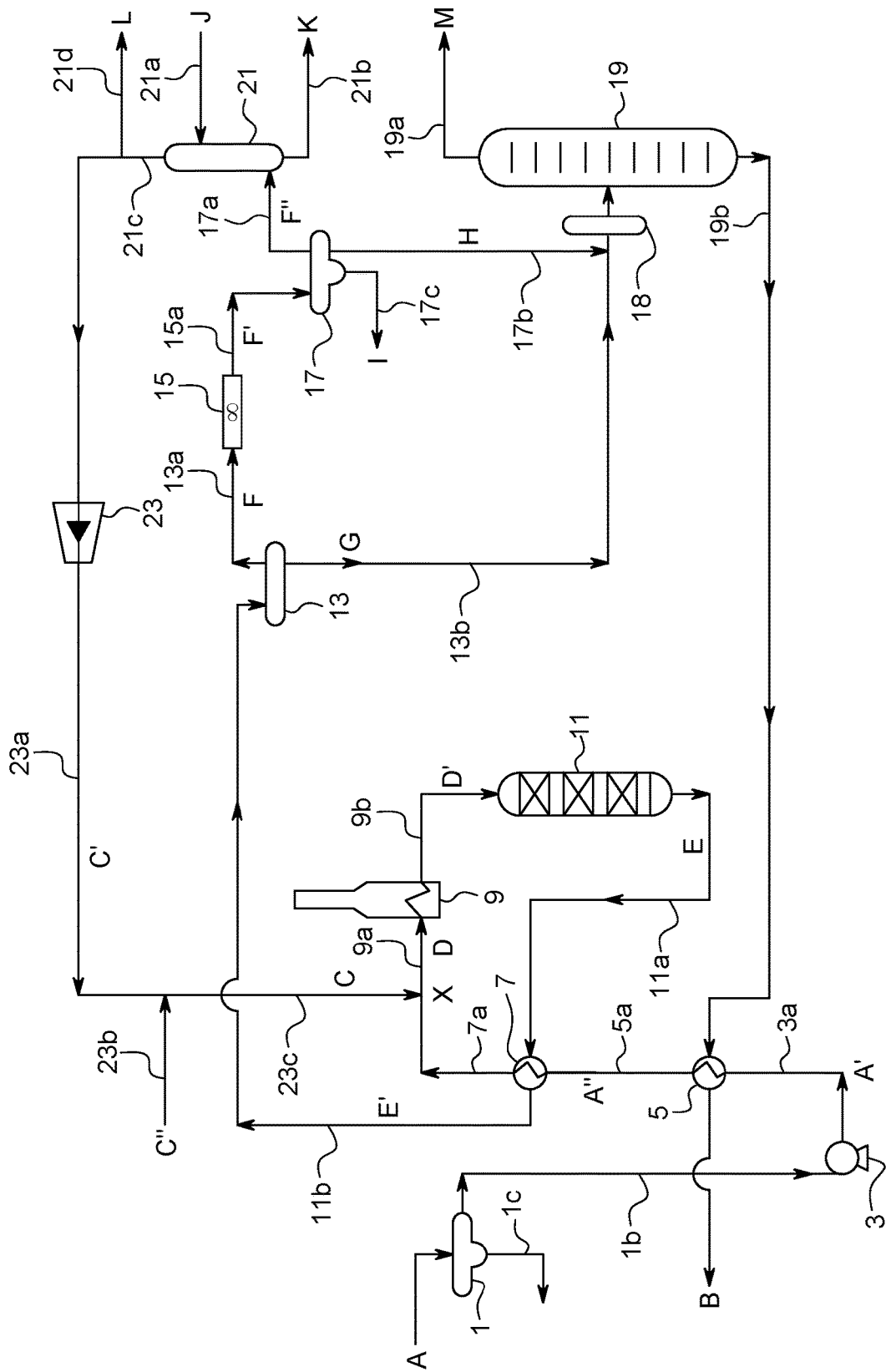
FIG. 5 is a basic schematic diagram of a plant to produce Product HMFO utilizing a combination of a core process and later ionic liquid extraction process to produce Product HMFO.

In FIGS. 4 and 5, Feedstock HMFO (A) is fed from outside the battery limits (OSBL) to the Oil Feed Surge Drum (1) that receives feed from outside the battery limits (OSBL) and provides surge volume adequate to ensure smooth operation of the unit. Water entrained in the feed is removed from the HMFO with the water being discharged a stream (1c) for treatment OSBL.

As shown in FIG. 4, the Feedstock HMFO (A) is withdrawn from the Oil Feed Surge Drum (1) via line (1b) by the Oil Feed Pump (3) and sent to the ionic liquid extraction vessel 2 as a pretreatment step. The pre-treated Feedstock HMFO is pressurized to a pressure required for the process. The pressurized HMFO (A') then passes through line (3a) to the Oil Feed/Product Heat Exchanger (5) where the pressurized HMFO (A') is partially heated by the Product HMFO (B). The pressurized Feedstock HMFO (A') passing through line (5a) is further heated against the effluent from the Reactor System (E) in the Reactor Feed/Effluent Heat Exchanger (7).

As shown in FIG. 5, the Feedstock HMFO (A) is withdrawn from the Oil Feed Surge Drum (1) via line (1b) by the Oil Feed Pump (3) and is pressurized to a pressure required for the process. The pressurized HMFO (A') then passes through line (3a) to the Oil Feed/Product Heat Exchanger (5) where the pressurized HMFO (A') is partially heated by the Product HMFO (B). The pressurized Feedstock HMFO (A') passing through line (5a) is further heated against the effluent from the Reactor System (E) in the Reactor Feed/Effluent Heat Exchanger (7).

In both FIG. 4 and FIG. 5, the heated and pressurized Feedstock HMFO (A") in line (7a) is then mixed with Activating Gas (C) provided via line (23c) at Mixing Point (X) to form a Feedstock Mixture (D). The mixing point (X) can be any well know gas/liquid mixing system or entrainment mechanism well known to one skilled in the art.

The Feedstock Mixture (D) passes through line (9a) to the Reactor Feed Furnace (9) where the Feedstock Mixture (D) is heated to the specified process temperature. The Reactor Feed Furnace (9) may be a fired heater furnace or any other kind to type of heater as known to one of skill in the art if it will raise the temperature of the Feedstock mixture to the desired temperature for the process conditions.

The heated Feedstock Mixture (D') exits the Reactor Feed Furnace (9) via line 9b and is fed into the Reactor System (11). The heated Feedstock Mixture (D') enters the Reactor System (11) where environmental contaminates, such a sulfur, nitrogen, and metals are preferentially removed from the Feedstock HMFO component of the heated Feedstock Mixture. The Reactor System contains a catalyst which preferentially removes the sulfur compounds in the Feedstock HMFO component by reacting them with hydrogen in the Activating Gas to form hydrogen sulfide. The Reactor System will also achieve demetalization, denitrogenation, and a certain amount of ring opening hydrogenation of the complex aromatics and asphaltenes, however minimal hydrocracking of hydrocarbons should take place. The process conditions of hydrogen partial pressure, reaction pressure, temperature and residence time as measured by time space velocity are optimized to achieve desired final product quality. A more detailed discussion of the Reactor System, the catalyst, the process conditions, and other aspects of the process are contained below in the "Reactor System Description."

The Reactor System Effluent (E) exits the Reactor System (11) via line (11a) and exchanges heat against the pressurized and partially heats the Feedstock HMFO (A') in the Reactor Feed/Effluent Exchanger (7). The partially cooled Reactor System Effluent (E') then flows via line (11c) to the Hot Separator (13).

The Hot Separator (13) separates the gaseous components of the Reactor System Effluent (F) which are directed to line (13a) from the liquid components of the Reactor System effluent (G) which are directed to line (13b). The gaseous components of the Reactor System effluent in line (13a) are cooled against air in the Hot Separator Vapor Air Cooler (15) and then flow via line (15a) to the Cold Separator (17).

The Cold Separator (17) further separates any remaining gaseous components from the liquid components in the cooled gaseous components of the Reactor System Effluent (F'). The gaseous components from the Cold Separator (F") are directed to line (17a) and fed onto the Amine Absorber (21). The Cold Separator (17) also separates any remaining Cold Separator hydrocarbon liquids (H) in line (17b) from any Cold Separator condensed liquid water (I). The Cold Separator condensed liquid water (I) is sent OSBL via line (17c) for treatment.

In FIG. 4, the hydrocarbon liquid components of the Reactor System effluent from the Hot Separator (G) in line (13b) and the Cold Separator hydrocarbon liquids (H) in line (17b) are combined and are fed to the Oil Product Stripper System (19). The Oil Product Stripper System (19) removes any residual hydrogen and hydrogen sulfide from the Product HMFO (B) which is discharged in line (19b) to storage OSBL. The vent stream (M) from the Oil Product Stripper in line (19a) may be sent to the fuel gas system or to the flare system that are OSBL.

In FIG. 5, the hydrocarbon liquid components of the Reactor System effluent from the Hot Separator (G) in line (13b) and the Cold Separator hydrocarbon liquids (H) in line (17b) are combined and are fed to the ionic liquid extraction unit 18 prior to being sent to the Oil Product Stripper System (19). The Oil Product Stripper System (19) removes any residual hydrogen and hydrogen sulfide from the Product HMFO (B) which is discharged in line (19b) to storage OSBL. The vent stream (M) from the Oil Product Stripper in line (19a) may be sent to the fuel gas system or to the flare system that are OSBL.

The gaseous components from the Cold Separator (F") in line (17a) contain a mixture of hydrogen, hydrogen sulfide and light hydrocarbons (mostly methane and ethane). This vapor stream (17a) feeds an Amine Absorber (21) where it is contacted against Lean Amine (J) provided OSBL via line (21a) to the Amine Absorber (21) to remove hydrogen sulfide from the gases making up the Activating Gas recycle stream (C'). Rich amine (K) which has absorbed hydrogen sulfide exits the bottom of the Amine Absorber (21) and is sent OSBL via line (21b) for amine regeneration and sulfur recovery.

The Amine Absorber overhead vapor in line (21c) is preferably recycled to the process as a Recycle Activating Gas (C') via the Recycle Compressor (23) and line (23 a) where it is mixed with the Makeup Activating Gas (C") provided OSBL by line (23b). This mixture of Recycle Activating Gas (C') and Makeup Activating Gas (C") to form the Activating Gas (C) utilized in the process via line (23c) as noted above. A Scrubbed Purge Gas stream (H) is taken from the Amine Absorber overhead vapor line (21c) and sent via line (21d) to OSBL to prevent the buildup of light hydrocarbons or other non-condensables.

Reactor System Description:

The core process Reactor System (11) illustrated in FIG. 4 and FIG. 5 comprises a single reactor vessel loaded with the process catalyst and sufficient controls, valves and sensors as one of skill in the art would readily appreciate.

Alternative Reactor Systems in which more than one reactor vessel may be utilized in parallel or in a cascading series can easily be substituted for the single reactor vessel Reactor System 11 shown. In such an embodiment, each reactor vessel is similarly loaded with process catalyst and can be provided the heated Feed Mixture (D') via a common line. The effluent from each of the three reactors is recombined in line and forms a combined Reactor Effluent (E) for further processing as described above. The illustrated arrangement will allow the three reactors to carry out the process effectively multiplying the hydraulic capacity of the overall Reactor System. Control valves and isolation valves may also prevent feed from entering one reactor vessel but not another reactor vessel. In this way one reactor can be by-passed and placed off-line for maintenance and reloading of catalyst while the remaining reactors continues to receive heated Feedstock Mixture (D'). It will be appreciated by one of skill in the art this arrangement of reactor vessels in parallel is not limited in number to three, but multiple additional reactor vessels can be added as shown by dashed line reactor. The only limitation to the number of parallel reactor vessels is plot spacing and the ability to provide heated Feedstock Mixture (D') to each active reactor.

In another illustrative embodiment cascading reactor vessels are loaded with process catalyst with the same or different activities toward metals, sulfur or other environmental contaminates to be removed. For example, one reactor may be loaded with a highly active demetaling catalyst, a second subsequent or downstream reactor may be loaded with a balanced demetaling/desulfurizing catalyst, and reactor downstream from the second reactor may be loaded with a highly active desulfurization catalyst. This allows for greater control and balance in process conditions (temperature, pressure, space flow velocity, etc. . . . ) so it is tailored for each catalyst. In this way one can optimize the parameters in each reactor depending upon the material being fed to that specific reactor/catalyst combination and minimize the hydrocracking reactions. As with the prior illustrative embodiment, multiple cascading series of reactors can be utilized in parallel and in this way the benefits of such an arrangement noted above (i.e. allow one series to be "online" while the other series is "off line" for maintenance or allow increased plant capacity).

The reactor(s) that form the Reactor System may be fixed bed, ebulliated bed or slurry bed or a combination of these types of reactors. As envisioned, fixed bed reactors are preferred as these are easier to operate and maintain.

The reactor vessel in the Reactor System is loaded with one or more process catalysts. The exact design of the process catalyst system is a function of feedstock properties, product requirements and operating constraints and optimization of the process catalyst can be carried out by routine trial and error by one of ordinary skill in the art.

The process catalyst(s) comprise at least one metal selected from the group consisting of the metals each belonging to the groups 6, 8, 9 and 10 of the Periodic Table, and more preferably a mixed transition metal catalyst such as Ni—Mo, Co—Mo, Ni—W or Ni—Co—Mo are utilized. The metal is preferably supported on a porous inorganic oxide catalyst carrier. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier. The preferred porous inorganic oxide catalyst carrier is alumina. The pore size and metal loadings on the carrier may be systematically varied and tested with the desired feedstock and process conditions to optimize the properties of the Product HMFO. Such activities are well known and routine to one of skill in the art. Catalyst in the fixed bed reactor(s) may be dense-loaded or sock-loaded.

The catalyst selection utilized within and for loading the Reactor System may be preferential to desulfurization by designing a catalyst loading scheme that results in the Feedstock mixture first contacting a catalyst bed that with a catalyst preferential to demetalization followed downstream by a bed of catalyst with mixed activity for demetalization and desulfurization followed downstream by a catalyst bed with high desulfurization activity. In effect the first bed with high demetalization activity acts as a guard bed for the desulfurization bed.

The objective of the Reactor System is to treat the Feedstock HMFO at the severity required to meet the Product HMFO specification. Demetalization, denitrogenation and hydrocarbon hydrogenation reactions may also occur to some extent when the process conditions are optimized so the performance of the Reactor System achieves the required level of desulfurization. Hydrocracking is preferably minimized to reduce the volume of hydrocarbons formed as by-product hydrocarbons to the process. The objective of the process is to selectively remove the environmental contaminates from Feedstock HMFO and minimize the formation of unnecessary by-product hydrocarbons (C1-C8 hydrocarbons).

The process conditions in each reactor vessel will depend upon the feedstock, the catalyst utilized and the desired final properties of the Product HMFO desired. Variations in conditions are to be expected by one of ordinary skill in the art and these may be determined by pilot plant testing and systematic optimization of the process. With this in mind it has been found that the operating pressure, the indicated operating temperature, the ratio of the Activating Gas to Feedstock HMFO, the partial pressure of hydrogen in the Activating Gas and the space velocity all are important parameters to consider. The operating pressure of the Reactor System should be in the range of 250 psig and 3000 psig, preferably between 1000 psig and 2500 psig and more preferably between 1500 psig and 2200 psig. The indicated operating temperature of the Reactor System should be 500° F. to 900° F., preferably between 650° F. and 850° F. and more preferably between 680° F. and 800° F.

The ratio of the quantity of the Activating Gas to the quantity of Feedstock HMFO should be in the range of 250 scf gas/bbl of Feedstock HMFO to 10,000 scf gas/bbl of Feedstock HMFO, preferably between 2000 scf gas/bbl of Feedstock HMFO to 5000 scf gas/bbl of Feedstock HMFO and more preferably between 2500 scf gas/bbl of Feedstock HMFO to 4500 scf gas/bbl of Feedstock HMFO. The Activating Gas should be selected from mixtures of nitrogen, hydrogen, carbon dioxide, gaseous water, and methane, so Activating Gas has an ideal gas partial pressure of hydrogen ($p_{H2}$) greater than 80% of the total pressure of the Activating Gas mixture (P) and preferably wherein the Activating Gas has an ideal gas partial pressure of hydrogen ($p_{H2}$) greater than 95% of the total pressure of the Activating Gas mixture (P). The Activating Gas may have a hydrogen mole fraction in the range between 80% of the total moles of Activating Gas mixture and more preferably wherein the Activating Gas has a hydrogen mole fraction between 80% and 99% of the total moles of Activating Gas mixture. The liquid hourly space velocity within the Reactor System should be between 0.05 oil/hour/m$^3$ catalyst and 1.0 oil/hour/m$^3$ catalyst; preferably between 0.08 oil/hour/m$^3$ catalyst and 0.5 oil/hour/m$^3$ catalyst and more preferably between 0.1 oil/hour/m$^3$ catalyst and 0.3 oil/hour/m$^3$ catalyst to achieve deep desulfurization with product sulfur levels below 0.1 ppmw.

The hydraulic capacity rate of the Reactor System should be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day. The desired hydraulic capacity may be achieved in a single reactor vessel Reactor System or in a multiple reactor vessel Reactor System.

This example will provide one skilled in the art with a more specific illustrative embodiment for conducting the process disclosed and claimed herein:

Core Process Pilot Unit Set Up:

The pilot unit will be set up with two 434 cm$^3$ reactors arranged in series to process the feedstock HMFO. The lead reactor will be loaded with a blend of a commercially available hydro-demetaling (HDM) catalyst and a commercially available hydro-transition (HDT) catalyst. One of skill in the art will appreciate that the HDT catalyst layer may be formed and optimized using a mixture of HDM and HDS catalysts combined with an inert material to achieve the desired intermediate/transition activity levels. The second reactor was loaded with a blend of the commercially available hydro-transition (HDT) and a commercially available hydrodesulfurization (HDS). Alternatively, one can load the second reactor simply with a commercially hydrodesulfurization (HDS) catalyst. One of skill in the art will appreciate that the specific feed properties of the Feedstock HMFO may affect the proportion of HDM, HDT and HDS catalysts in the reactor system. A systematic process of testing different combinations with the same feed will yield the optimized catalyst combination for any feedstock and reaction conditions. For this example, the first reactor was loaded with ⅔ hydro-demetaling catalyst and ⅓ hydro-transition catalyst. The second reactor was loaded with all hydrodesulfurization catalyst. The catalysts in each reactor were mixed with glass beads (approximately 50% by volume) to improve liquid distribution and better control reactor temperature. For this pilot test run, we used these catalysts: HDM: Albemarle KFR 20 series or equivalent; HDT: Albemarle KFR 30 series or equivalent; HDS: Albemarle KFR 50 or KFR 70 or equivalent. Once set up of the pilot unit was complete, the catalyst was activated by sulfiding the catalyst in a manner well known to one of skill in the art.

Core Process Unit Operation:

Upon completion of the activating step, the pilot unit was ready to receive the feedstock HMFO and Activating Gas feed. For the present example, the Activating Gas was technical grade or better hydrogen gas. The mixed Feedstock HMFO and Activating Gas was provided to the pilot plant at rates and operating conditions as specified: Oil Feed Rate: 108.5 ml/h (space velocity=0.25/h); Hydrogen/Oil Ratio: 570 Nm3/m3 (3200 scf/bbl); Reactor Temperature: 372° C. (702° F.); Reactor Outlet Pressure: 13.8 MPa(g) (2000 psig).

One of skill in the art will know that the rates and conditions may be systematically adjusted and optimized depending upon feed properties to achieve the desired product requirements. The unit was brought to a steady state for each condition and full samples taken so analytical tests were completed. Material balance for each condition was closed before moving to the next condition.

Expected impacts on the Feedstock HMFO properties are: Sulfur Content (wt %): Reduced by at least 80%; Metals Content (wt %): Reduced by at least 80%; MCR/Asphaltene Content (wt %): Reduced by at least 30%; Nitrogen Content (wt %): Reduced by at least 20%; C1-Naphtha Yield (wt %): Not over 3.0% and preferably not over 1.0%.

Process conditions in the Core Process Pilot Unit were systematically adjusted as per Table 1 to assess the impact of process conditions and optimize the performance of the process for the specific catalyst and feedstock HMFO utilized.

TABLE 1

Optimization of Core Process Conditions

| Case | HC Feed Rate (ml/h), [LHSV(/h)] | Nm$^3$ H$_2$/m$^3$ oil/ scf H$_2$/bbl oil | Temp (° C./° F.) | Pressure (MPa(g)/psig) |
|---|---|---|---|---|
| Baseline | 108.5 [0.25] | 570/3200 | 372/702 | 13.8/2000 |
| T1 | 108.5 [0.25] | 570/3200 | 362/684 | 13.8/2000 |
| T2 | 108.5 [0.25] | 570/3200 | 382/720 | 13.8/2000 |
| L1 | 130.2 [0.30] | 570/3200 | 372/702 | 13.8/2000 |
| L2 | 86.8 [0.20] | 570/3200 | 372/702 | 13.8/2000 |
| H1 | 108.5 [0.25] | 500/2810 | 372/702 | 13.8/2000 |
| H2 | 108.5 [0.25] | 640/3590 | 372/702 | 13.8/2000 |
| S1 | 65.1 [0.15] | 620/3480 | 385/725 | 15.2/2200 |

In this way, the conditions of the core process unit will be optimized to achieve less than 0.5% wt. sulfur product HMFO and preferably a 0.1% wt. sulfur product HMFO. Conditions for producing ULS-HMFO (i.e. 0.1% wt. sulfur product HMFO) will be: Feedstock HMFO Feed Rate: 65.1 ml/h (space velocity=0.15/h); Hydrogen/Oil Ratio: 620 Nm³/m³ (3480 scf/bbl); Reactor Temperature: 385° C. (725° F.); Reactor Outlet Pressure: 15 MPa(g) (2200 psig)

Pre-Treatment Ionic Liquid Extraction Unit Pilot Test:

Approximately 1000 gm of Feedstock HMFO will be placed under and inert atmosphere (preferably nitrogen) and heated to approximately 100° C. (220° F.) to 120° C. (250° F.) to achieve a viscosity suitable for the pumping and flow of the HMFO as a liquid. Approximately 100 gm of a selected ionic liquid material can then be added to the heated HMFO and the mixture stirred for approximately 1 hour to simulate a stirred tank reactor.

For this pilot test the ionic liquid utilized can be selected from the group ionic liquids in Table 2.

TABLE 2

Pilot Test Ionic Liquid Extraction Process

| Example | Ionic Liquid (IL). |
|---|---|
| 1 | Tetrabutylphosphonium methanesulfonate |
| 2 | 1-butyl-4-methypyridinium hexafluorophosphate |
| 3 | 1-butyl-3-methyl imidazolium hexafluorophosphate |
| 4 | 1-butyl-3-methyl imidazolium tetrafluoroborate |
| 5 | 1-methyl imidazolium trifluoroacetate |
| 6 | Pyridinium p-toluene sulfonate |
| 7 | Tributylethylphosphonium diethylphosphate |
| 8 | 80% tributylethylphosphonium diethylphosphate + 20% tetradecyltrihexylphosphonium bromide |

The liquid HMFO can be separated from the ionic liquid by decanting after settling/gravity separation, resulting in a HMFO that will be substantially ionic liquid free. A water wash of the HFMO will remove any residual ionic liquid that may interfere in the subsequent processing of the HMFO. This HMFO material is subsequently treated in the Core Process Pilot Test Unit described above to give a Product HMFO.

Post-Treatment Ionic Liquid Extraction Unit Pilot Test: Approximately 1000 gm of effluent from the Core Process Pilot Test Unit described above will be placed under and inert atmosphere (preferably nitrogen) and heated to approximately 100° C. (220° F.) to 120° C. (250° F.) to achieve a viscosity suitable for the pumping and flow of the HMFO as a liquid. Approximately 100 gm of a selected ionic liquid material can then be added to the heated HMFO and the mixture stirred for approximately 1 hour to simulate a stirred tank reactor.

For this pilot test the ionic liquid utilized can be selected from the group of ionic liquids in Table 2.

The liquid HMFO can be separated from the ionic liquid material by decanting after settling/gravity separation, resulting in a product HMFO that will be substantially ionic liquid free. A water wash of the HFMO will remove any residual ionic liquid that may interfere in the subsequent processing of the HMFO.

Table 3 summarizes the impacts on key properties of HMFO by the Core Process Pilot Unit.

TABLE 3

Expected Impact of Process on Key Properties of HMFO

| Property | Minimum | Typical | Maximum |
|---|---|---|---|
| Sulfur Conversion/Removal | 90% | 95% | 99% |
| Metals Conversion/Removal | 80% | 90% | 100% |
| MCR Reduction | 30% | 50% | 70% |

TABLE 3-continued

Expected Impact of Process on Key Properties of HMFO

| Property | Minimum | Typical | Maximum |
|---|---|---|---|
| Asphaltene Reduction | 30% | 50% | 70% |
| Nitrogen Conversion | 10% | 30% | 70% |
| C1 through Naphtha Yield | 0.5% | 1.0% | 4.0% |
| Hydrogen Consumption (scf/bbl) | 500 | 750 | 1500 |

Table 4 lists analytical tests carried out for the characterization of the Feedstock HMFO and Product HMFO. The analytical tests included those required by ISO for the Feedstock HMFO and the product HMFO to qualify and trade in commerce as ISO compliant residual marine fuels. The additional parameters are provided so that one skilled in the art can understand and appreciate the effectiveness of the inventive process.

TABLE 4

Analytical Tests and Testing Procedures

| | |
|---|---|
| Sulfur Content | ISO 8754 or ISO 14596 or ASTM D4294 |
| Density @ 15° C. | ISO 3675 or ISO 12185 |
| Kinematic Viscosity @ 50° C. | ISO 3104 |
| Pour Point, ° C. | ISO 3016 |
| Flash Point, ° C. | ISO 2719 |
| CCAI | ISO 8217, ANNEX B |
| Ash Content | ISO 6245 |
| Total Sediment - Aged | ISO 10307-2 |
| Micro Carbon Residue, mass % | ISO 10370 |
| H2S, mg/kg | IP 570 |
| Acid Number | ASTM D664 |
| Water | ISO 3733 |
| Specific Contaminants | IP 501 or IP 470 (unless indicated otherwise) |
| Vanadium | or ISO 14597 |
| Sodium | |
| Aluminum | or ISO 10478 |
| Silicon | or ISO 10478 |
| Calcium | or IP 500 |
| Zinc | or IP 500 |
| Phosphorous | IP 500 |
| Nickle | |
| Iron | |
| Distillation | ASTM D7169 |
| C:H Ratio | ASTM D3178 |
| SARA Analysis | ASTM D2007 |
| Asphaltenes, wt % | ASTM D6560 |
| Total Nitrogen | ASTM D5762 |
| Vent Gas Component Analysis | FID Gas Chromatography or comparable |

Table 5 contains the expected analytical test results for (A) Feedstock HMFO; (B) the Core Process Product HMFO and (C) Overall Process (Core+post ionic liquid extraction) from the inventive process These results will indicate to one of skill in the art that the production of a ULS HMFO can be achieved. It will be noted by one of skill in the art that under the conditions, the levels of hydrocarbon cracking will be minimized to levels substantially lower than 10%, more preferably less than 5% and even more preferably less than 1% of the total mass balance.

TABLE 5

Analytical Results

| | A | B | C |
|---|---|---|---|
| Sulfur Content, mass % | 3.0 | Less than 0.5 | Less than 0.1 |
| Density @ 15° C., kg/m³ | 990 | 950 [(1)] | 950 [(1)] |

TABLE 5-continued

Analytical Results

| | A | B | C |
|---|---|---|---|
| Kinematic Viscosity @ 50° C., mm²/s | 380 | 100 [1] | 100 [1] |
| Pour Point, ° C. | 20 | 10 | 10 |
| Flash Point, ° C. | 110 | 100 [1] | 100 [1] |
| CCAI | 850 | 820 | 820 |
| Ash Content, % wt. | 0.1 | 0.0 | 0.0 |
| Total Sediment - Aged, mass % | 0.1 | 0.0 | 0.0 |
| Micro Carbon Residue, mass % | 13.0 | 6.5 | 6.5 |
| H2S, mg/kg | 0 | 0 | 0 |
| Acid Number, mg KO/g | 1 | 0.5 | 0.5 |
| Water, vol % | 0.5 | 0 | 0 |
| Specific Contaminants, mg/kg | | | |
| Vanadium | 180 | 20 | 20 |
| Sodium | 30 | 1 | 1 |
| Aluminum | 10 | 1 | 1 |
| Silicon | 30 | 3 | 3 |
| Calcium | 15 | 1 | 1 |
| Zinc | 7 | 1 | 1 |
| Phosphorous | 2 | 0 | 0 |
| Nickle | 40 | 5 | 5 |
| Iron | 20 | 2 | 2 |
| Distillation, ° C./° F. | | | |
| IBP | 160/320 | 120/248 | 120/248 |
| 5% wt | 235/455 | 225/437 | 225/437 |
| 10% wt | 290/554 | 270/518 | 270/518 |
| 30% wt | 410/770 | 370/698 | 370/698 |
| 50% wt | 540/1004 | 470/878 | 470/878 |
| 70% wt | 650/1202 | 580/1076 | 580/1076 |
| 90% wt | 735/1355 | 660/1220 | 660/1220 |
| FBP | 820/1508 | 730/1346 | 730/1346 |
| C:H Ratio (ASTM D3178) | 1.2 | 1.3 | 1.3 |
| SARA Analysis | | | |
| Saturates | 16 | 22 | 22 |
| Aromatics | 50 | 50 | 50 |
| Resins | 28 | 25 | 25 |
| Asphaltenes | 6 | 3 | 3 |
| Asphaltenes, wt % | 6.0 | 2.5 | 2.5 |
| Total Nitrogen, mg/kg | 4000 | 3000 | 3000 |

Note:
[1] It is expected that property will be adjusted to a higher value by post process removal of light material via distillation or stripping from product HMFO.

It will be appreciated by those skilled in the art that changes could be made to the illustrative embodiments described above without departing from the broad inventive concepts thereof. It is understood, therefore, that the inventive concepts disclosed are not limited to the illustrative embodiments or examples disclosed, but it is intended to cover modifications within the scope of the inventive concepts as defined by the claims.

The invention claimed is:

1. A process for reducing the environmental contaminants in a Feedstock Heavy Marine Fuel Oil, the process comprising: contacting a Feedstock Heavy Marine Fuel Oil with a ionic liquid under extractive desulfurizing conditions to give a pre-treated Feedstock Heavy Marine Fuel Oil; mixing a quantity of the pre-treated Feedstock Heavy Marine Fuel Oil with a quantity of Activating Gas mixture to give a Feedstock Mixture; contacting the Feedstock Mixture with one or more catalysts under desulfurizing conditions to form a Process Mixture from said Feedstock Mixture; receiving said Process Mixture and separating a Product Heavy Marine Fuel Oil from any gaseous components and any by-product hydrocarbon components of the Process Mixture and, discharging the Product Heavy Marine Fuel Oil.

2. The process of claim 1 wherein said Feedstock Heavy Marine Fuel Oil complies with ISO 8217:2017 and has a sulfur content (ISO 14596 or ISO 8754) between the range of 5.0% wt. to 1.0% wt.

3. The process of claim 1, wherein said Feedstock Heavy Marine Fuel Oil has: a maximum kinematic viscosity at 50 C (ISO 3104) between the range from 180 mm²/s to 700 mm²/s and a maximum density at 15 C (ISO 3675) between the range of 991.0 kg/m³ to 1010.0 kg/m³ and a CCAI is in the range of 780 to 870 and a flash point (ISO 2719) no lower than 60.0 C and a maximum total sediment—aged (ISO 10307-2) of 0.10% wt. and a maximum carbon residue—micro method (ISO 10370) between the range of 18.00% wt. and 20.00% wt. and a maximum vanadium content (ISO 14597) between the range from 350 mg/kg to 450 ppm mg/kg and a maximum aluminum plus silicon (ISO 10478) content of 60 mg/kg.

4. The process of claim 1, wherein the ionic liquid is selected from the group consisting of imidazolium ionic liquids, pyridinium ionic liquids, phosphonium ionic liquids, lactamium ionic liquids, ammonium ionic liquids, pyrrolidinium ionic liquids, and combinations thereof.

5. The process of claim 4, wherein the extractive desulfurizing conditions comprise: a temperature in the range of about 50° C. to about 500° C., a weight ratio of Heavy Marine Fuel Oil to ionic liquid in the range about 1:100 to about 100:1, and a contacting time in the range of about 1 min to about 2 hr.

6. The process of claim 1, wherein the catalyst comprises: a porous inorganic oxide catalyst carrier and a transition metal catalyst, wherein the porous inorganic oxide catalyst carrier is at least one carrier selected from the group consisting of alumina, alumina/bona carrier, a carrier containing metal-containing aluminosilicate, alumina/phosphorus carrier, alumina/alkaline earth metal compound carrier, alumina/titania carrier and alumina/zirconia carrier, and wherein the transition metal catalyst is one or more metals selected from the group consisting of group 6, 8, 9 and 10 of the Periodic Table and wherein the Activating Gas is selected from mixtures of nitrogen, hydrogen, carbon dioxide, gaseous water, and methane, such that Activating Gas has an ideal gas partial pressure of hydrogen ($p_{H2}$) greater than 80% of the total pressure of the Activating Gas mixture (P).

7. The process of claim 6, wherein the step of contacting the Feedstock Mixture with one or more catalysts under desulfurizing conditions to form a Process Mixture from said Feedstock Mixture comprise: the ratio of the quantity of the Activating Gas to the quantity of Feedstock Heavy Marine Fuel Oil is in the range of 250 scf gas/bbl of Feedstock Heavy Marine Fuel Oil to 10,000 scf gas/bbl of Feedstock Heavy Marine Fuel Oil; a the total pressure is between of 250 psig and 3000 psig; and, the indicated temperature is between of 500° F. to 900° F., and, wherein the liquid hourly space velocity is between 0.05 oil/hour/m³ catalyst and 1.0 oil/hour/m³ catalyst.

8. The process of claim 1, wherein said Product Heavy Marine Fuel Oil complies with ISO8217:2017 and has a maximum sulfur content (ISO 14596 or ISO 8754) between the range of 0.05% wt. to 1.0% wt.

9. The process of claim 1, wherein said Product Heavy Marine Fuel Oil has: a maximum kinematic viscosity at 50 C (ISO 3104) between the range from 180 mm²/s to 700 mm²/s; and a maximum density at 15 C (ISO 3675) between the range of 991.0 kg/m³ to 1010.0 kg/m³; and a CCAI is in the range of 780 to 870; and a flash point (ISO 2719) no lower than 60.0 C, and a maximum total sediment—aged (ISO 10307-2) of 0.10% wt, and a maximum carbon residue—micro method (ISO 10370) between the range of 18.00% wt. and 20.00% wt., and a maximum sulfur content (ISO 145% or ISO 8754) between the range of 0.05% wt to 1.0% wt, and a maximum vanadium content (ISO 14597) between the range from 350 mg/kg to 450 ppm mg/kg, and a maximum aluminum plus silicon (ISO 10478) content of 60 mg/kg.

10. A process for reducing the environmental contaminants in a Feedstock Heavy Marine Fuel Oil, the process comprising: mixing a quantity of Feedstock Heavy Marine Fuel Oil with a quantity of Activating Gas mixture to give a Feedstock Mixture; contacting the Feedstock Mixture with one or more catalysis under desulfurizing conditions to form a Process Mixture from said Feedstock Mixture; receiving said Process Mixture and separating hydrocarbon liquid components of the Process Mixture from any bulk gaseous components of the Process Mixture; receiving said hydrocarbon liquid components and contacting said hydrocarbon liquid components with a ionic liquid under extractive desulfurizing conditions; subsequently separating any residual gaseous components and any by-product hydrocarbon components from a Product Heavy Marine Fuel Oil; and, discharging the Product Heavy Marine Fuel Oil.

11. The process of claim 10 wherein said Feedstock Heavy Marine Fuel Oil complies with ISO8217:2017 and has a sulfur content (ISO 14596 or ISO 8754) between the range of 5.0% wt. to 1.0% wt.

12. The process of claim 10, wherein said Feedstock Heavy Marine Fuel Oil has: a maximum kinematic viscosity at 50° C. (ISO 3104) between the range from 180 mm²/s to 700 mm²/s and a maximum density at 15° C. (ISO 3675) between the range of 991.0 kg/m³ to 1010.0 kg/m³ and a CCAI is in the range of 780 to 870 and a flash point (ISO 2719) no lower than 60.0 C and, a maximum total sediment—aged (ISO 10307-2) of 0.10% wt. and a maximum carbon residue—micro method (ISO 10370) between the range of 18.00% wt. and 20.00% wt. and a maximum vanadium content (ISO 14597) between the range from 350 mg/kg to 450 ppm mg/kg and a maximum aluminum plus silicon (ISO 10478) content of 60 mg/kg.

13. The process of claim 10, wherein the ionic liquid is selected from the group consisting of imidazolium ionic liquids, pyridinium ionic liquids, phosphonium ionic liquids, lactamium ionic liquids, ammonium ionic liquids, pyrrolidinium ionic liquids, and combinations thereof.

14. The process of claim 13, wherein the extractive desulfurizing conditions comprise: a temperature in the range of about 50° C. to about 500° C., a weight ratio of Heavy Marine Fuel Oil to ionic liquid in the range about 1:100 to about 100:1, and a contacting time in the range of about 1 min to about 2 hr.

15. The process of claim 10, wherein the catalyst comprises: a porous inorganic oxide catalyst carrier and a transition metal catalyst, wherein the porous inorganic oxide catalyst carrier is at, least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier, and wherein the transition metal catalyst is one or more metals selected from the group consisting of group 6, 8, 9 and 10 of the Periodic Table; and wherein the Activating Gas is selected from mixtures of nitrogen, hydrogen, carbon dioxide, gaseous water, and methane, such that Activating Gas has an ideal gas partial pressure of hydrogen ($p_{H2}$) greater than 80% of the total pressure of the Activating Gas mixture (P).

16. The process of claim 15, wherein the step of contacting the Feedstock Mixture with one or more catalysts under desulfurizing conditions to form a Process Mixture from said Feedstock Mixture comprise: the ratio of the quantity of the Activating Gas to the quantity of Feedstock Heavy Marine Fuel Oil is in the range of 250 scf gas/bbl of Feedstock Heavy Marine Fuel Oil to 10,000 scf gas/bbl of Feedstock Heavy Marine Fuel Oil; a the total pressure is between of 250 psig and 3000 psig; and, the indicated temperature is between of 500 F to 900 F, and, wherein the liquid hourly space velocity is between 0.05 oil/hour/m³ catalyst and 1.0 oil/hour/m³ catalyst.

17. The process of claim 10, wherein said Product Heavy Marine Fuel Oil complies with ISO8217:2017 and has a maximum sulfur content (ISO 14596 or ISO 8754) between the range of 0.01% wt. to 1.0% wt.

18. The process of claim 17, wherein said Product Heavy Marine Fuel Oil has: a maximum kinematic viscosity at 50° C. (ISO 3104) between the range from 180 mm² s to 700 mm²/s; and a maximum density at 15° C. (ISO 3675) between the range of 991.0 kg/m³ to 1010.0 kg/m³; and a CCA1 is in the range of 780 to 870; and a flash point (ISO 2719) no lower than 60.0° C., and a maximum total sediment aged (ISO 10307-2) of 0.10% wt., and a maximum carbon residue—micro method (ISO 10370) between the range of 18.00% wt. and 20.00% wt., and a maximum sulfur content (ISO 14596 or ISO 8754) between the range of 0.05% wt. to 1.0% wt., and a maximum vanadium content (ISO 14597) between the range from 350 mg/kg to 450 ppm mg/kg, and a maximum aluminum plus silicon (ISO 10478) content of 60 mg/kg.

* * * * *